United States Patent [19]

Morton et al.

[11] Patent Number: 4,780,842
[45] Date of Patent: Oct. 25, 1988

[54] CELLULAR PROCESSOR APPARATUS CAPABLE OF PERFORMING FLOATING POINT ARITHMETIC OPERATIONS

[75] Inventors: Steven G. Morton, Oxford; Enrique J. Abreu, Shelton, both of Conn.

[73] Assignee: Alcatel USA, Corp., New York, N.Y.

[21] Appl. No.: 844,395

[22] Filed: Mar. 26, 1986

[51] Int. Cl.$^4$ ................ G06F 7/38; G06F 13/00
[52] U.S. Cl. .................................. 364/748; 364/200
[58] Field of Search ... 364/748, 749, 736, 200 MS File, 364/900 MS File

[56] References Cited

U.S. PATENT DOCUMENTS

| | | | |
|---|---|---|---|
| 4,507,748 | 3/1985 | Cotton | 364/749 |
| 4,546,428 | 10/1985 | Morton | 364/200 |
| 4,580,215 | 4/1986 | Morton | 364/200 |

*Primary Examiner*—Gary V. Harkcom
*Assistant Examiner*—Dale M. Shaw
*Attorney, Agent, or Firm*—Peter C. Van Der Sluys

[57] ABSTRACT

A processor apparatus which is capable of performing floating point arithmetic. The processor apparatus includes a plurality of individual processing cells which are interconnected from left to right in a chain so that any of the processor cells can operate to receive a bit of any slice in a digital word. Each cell includes a memory which essentially is coupled via a multiplexer to an arithmetic logic unit, a controllable multiplier quotient store, a controllable loop path, and controllable status path device. Each of these devices are under control of a control mechanism which is included in the cell, and therefore each path can be connected to any other path via various multiplexers utilized in the circuitry. Essentially, each cell includes a multiport RAM, programmable logic arrays which implement the control logic plus path logic which provides the communication between neighboring cells. In order to command a particular 1-bit processor to perform as a particular bit in a floating point word, a multiplicity of slice types is defined. Hence the floating point implementation requires 15 slice types to handle all different combinations of bit operations that must be performed. The logic is such that defective 1-bit processors appear invisible so that data can flow across them without interference. The cell is a relatively unified structure whereby each cell can be thus commanded to perform a particular operation on a particular slice of a given word independent of the operation of any other cell.

10 Claims, 23 Drawing Sheets

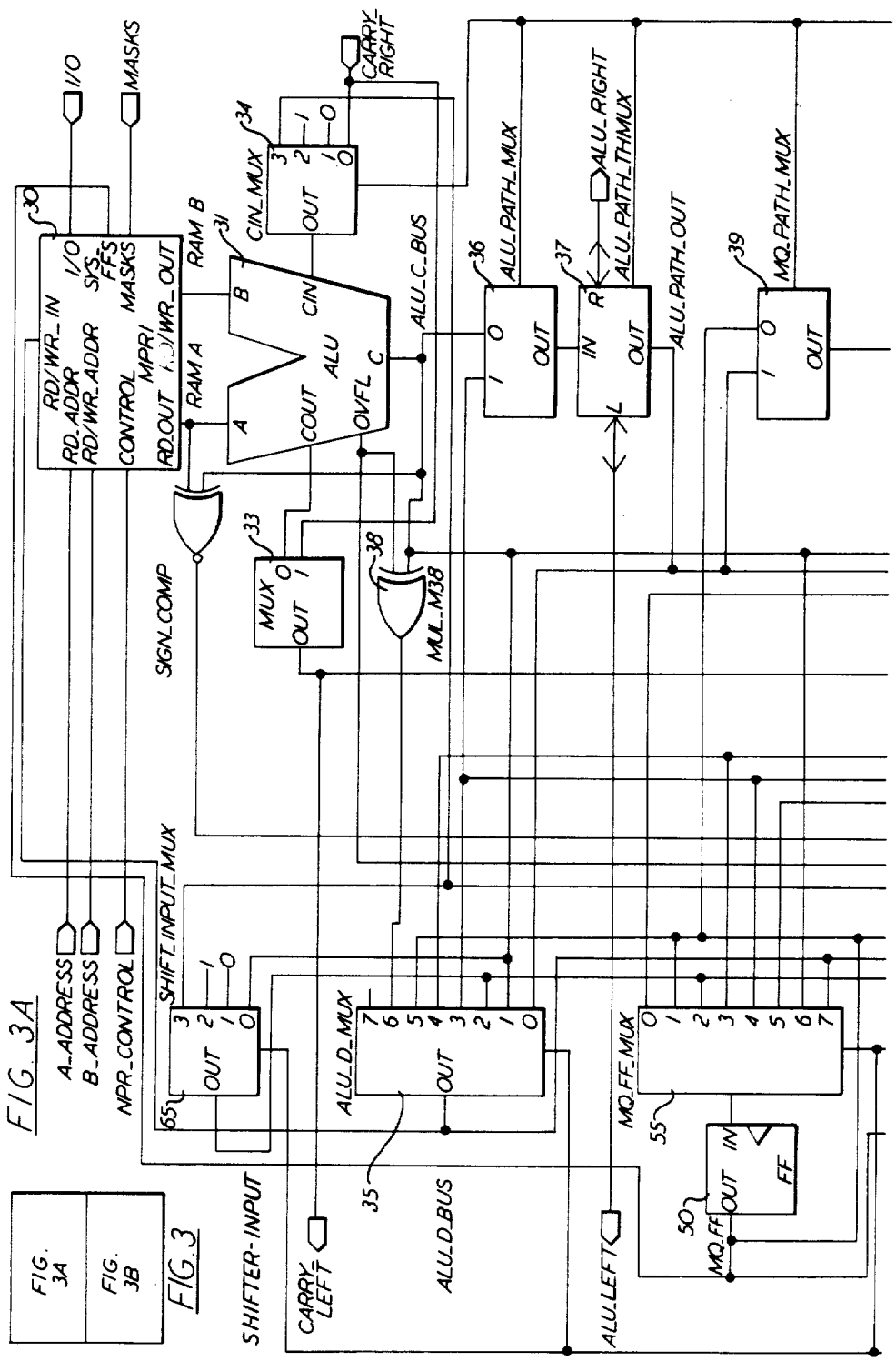

| SLICE TYPE | (IEEE 754) | SLICE TYPES MANTISSA | EXPONENT | INTEGER |
|---|---|---|---|---|
| MANTS | MANT LSS | STICKY BIT | DON'T CARE | LSS |
| MANR | MANT ISS | ROUND BIT | DON'T CARE | ISS |
| MANG | MANT ISS | GUARD BIT | DON'T CARE | ISS |
| MANTL | MANT ISS | LSS | DON'T CARE | ISS |
| MANI | MANT ISS | ISS | DON'T CARE | ISS |
| EXPL | EXP LSS | ISS | LSS | ISS |
| EXPI | EXP ISS | ISS | ISS | ISS |
| MANHMI | EXP ISS | ISS (BIT BEFORE BINARY PT.) | ISS | ISS |
| MANH | EXP ISS | MANH (HIDDEN BIT) | ISS | ISS |
| MANHP I | EXP ISS | OVERFLOW BIT | ISS | ISS |
| EXPI-MANX | EXP ISS | SIGN EXTN./RANGE EXPN. | ISS | ISS |
| EXP-MSS | EXP MSS | SIGN EXTN./RANGE EXPN. | MSS | ISS |
| SIGN | SIGN | SIGN | SIGN EXTEN/ RANGE EXPAN. | MSS |

FIG. 5

FLTSE PATH USAGE

FLTME

FLTSBNF

FLTMG

FLTME

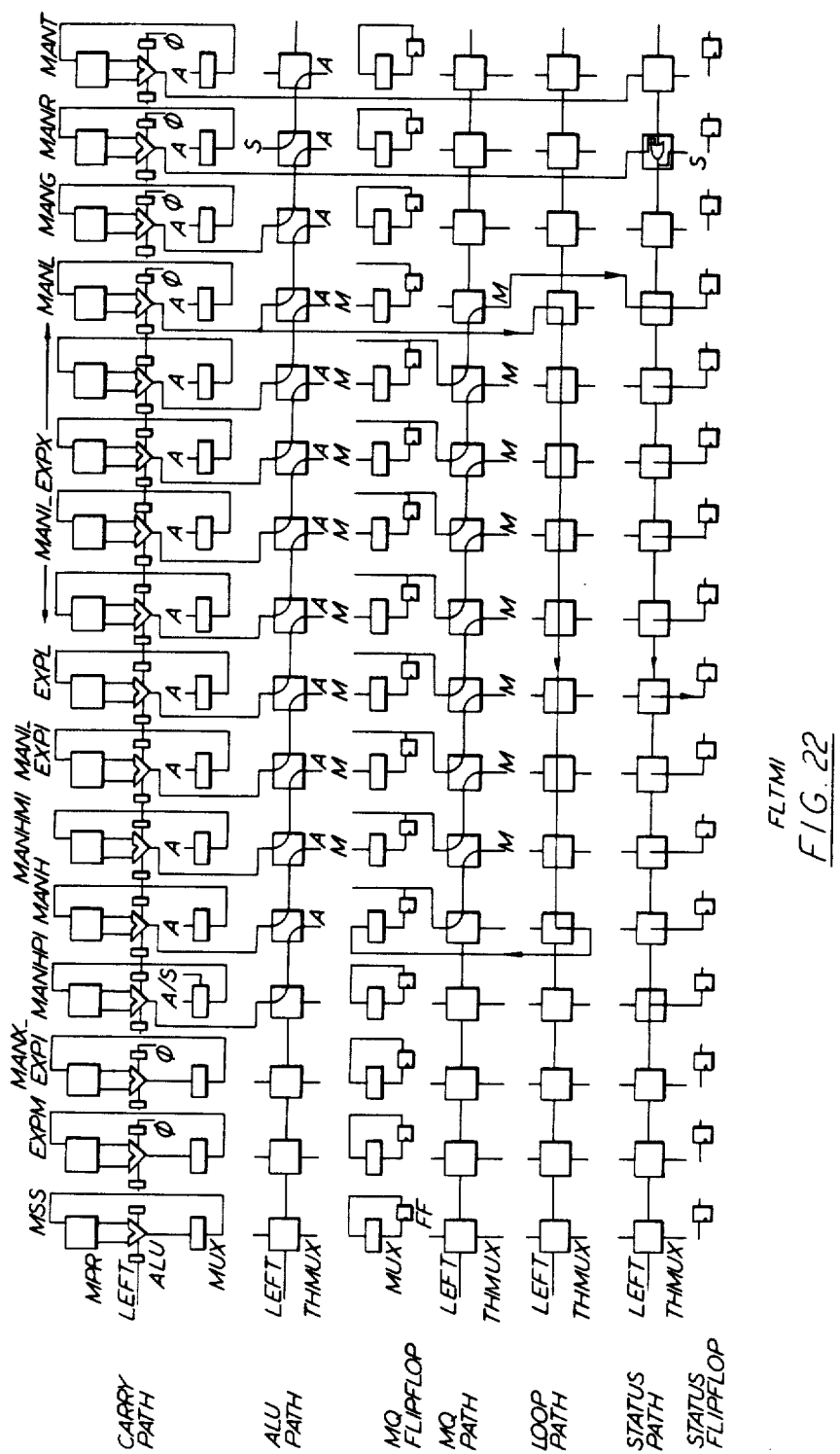

4,780,842

CELLULAR PROCESSOR APPARATUS CAPABLE OF PERFORMING FLOATING POINT ARITHMETIC OPERATIONS

BACKGROUND OF THE INVENTION

This invention relates to cellular processor apparatus in general and more particularly to a processor structure that can support floating point arithmetic operations.

There presently exists many integrated circuits that can implement floating point arithmetic. In view of this there are many manufacturers who supply integrated circuit structures which will perform floating point arithmetic while exhibiting very high performance. The major problem in manufacturing such structures is that the integrated circuit chip cannot be used or employed if there is a manufacturing defect on the chip. In addition, if a defect occurs during the life of the integrated circuit then the circuit also becomes useless.

Essentially, the prior art utilizes a single structure which does not possess spare elements so that when a fault occurs the entire structure becomes worthless. There has been described a number of techniques which are employed in large processing arrays which enable one to fabricate an array structure and then to incorporate on the same integrated circuit chip extra or spare cells. The purpose of the extra cells is to effectively utilize these cells to replace defective cells which may exist on the chip.

Thus the processor structure may be of very low cost because the structure provides very high manufacturing yields through the fault tolerance inherent in it. The architecture consists of a multiplicity of like single bit cells where the number of such cells that cooperate together to form a word is dynamically variable. In this manner the cells can be controlled by suitable instructions to perform arithmetic operations even though the integrated circuit chip contains defective components. Hence according to this procedure, integrated circuits may be fabricated wherein there exists defects at the time of manufacture. These defects will have minimal impact upon system performance. In this manner faulty or defective cells can be made invisible during the operation of the system and, therefore, have very little functional impact on system operation. Such techniques have been described in a co-pending application entitled AN ARRAY RECONFIGURATION APPARATUS AND METHODS PARTICULARLY ADAPTED FOR USE WITH VERY LARGE-SCALE INTEGRATED CIRCUITS filed on Oct. 2, 1985, for S. G. Morton, Ser. No. 782,850. This application essentially describes techniques for forming large integrated circuit arrays as well as processor arrays using spare components and spare wires.

There are many other applications which relate to processor arrays which describe such configurations in great detail. Certain of these applications which are co-pending are also pertinent to the general concepts of processing structures. For example, see the following: ASSOCIATIVE PROCESSOR WITH VARIABLE LENGTH FAST MULTIPLY CAPABILITY, U.S. Pat. No. 4,507,748 issued Mar. 26, 1985, to J. M. Cotton and assigned to the assignee herein. ASSOCIATIVE ARRAY WITH DYNAMICALLY ASSIGNABLE BIT FUNCTIONS, Ser. No. 473,365 filed on Mar. 8, 1983 to S. G. Morton et al and assigned to the assignee herein. ASSOCIATIVE ARRAY WITH FIVE ARITHMETIC PATHS, U.S. Pat. No. 4,580,215 issued Apr. 1, 1986 to S. G. Morton and assigned to the assignee herein.

ARRAY REORGANIZATION WITH INTERNAL CELLULAR CONTROL AND PROCESSING, Ser. No. 797,718 filed on Nov. 13, 1985 by S. G. Morton and assigned to the assignee herein. ASSOCIATIVE ARRAY WITH TRANSVERSAL HORIZONTAL MULTIPLEXERS, U.S. Pat. No. 4,546,428 issued Oct. 8, 1985, to S. G. Morton and commonly assigned herewith. IMPEDANCE RESTORATION FOR FAST CARRY PROPAGATION, U.S. Pat. No. 4,536,855 issued Aug. 20, 1985, to S. G. Morton.

ADDRESS GENERATION FOR CELLULAR ARRAY PROCESSORS, Ser. No. 803,364 filed on Dec. 2, 1985 by S. G. Morton.

In any event, a processor may consist of a rectangular array of like single bit components or cells, each of which as indicated is implemented in a Very Large Scale Integrated Circuit (VLSI). The cells in the processor array can cooperate to form words of varying size and can communicate in all four directions as right, left, up and down with their neighbors and can also communicate with external devices such as memory for input and output. These devices can perform fixed point and floating point arithmetic. The calculating ability of the processor is a function of the size of the array, the clock rate and other factors as well. In any event, such processing arrays in general are well known. The functions that are typically performed by the commercially available array processor chips include floating multiply, floating add, floating subtract, and floating divide.

In the case of the floating multiplier, the typical implementation in the prior art is to employ a large multiplier array and coupled to the array suitable logic to manipulate the exponent and to extract the mantissa bits from the floating point word. Those bits which are the mantissa bits are then injected back into the multiplier. In this manner, at the output of the multiplier the result is extracted. This result is then packed back into the word with the exponent where the exponent has been modified according to the two input terms.

Similarly, the floating point add unit typically has shift logic that can move the mantissa of a word that is lesser in magnitude so that the result in exponents may be the same. The addition is performed with one very large adder. The exponent is modified and the mantissa and exponent are merged back together for storage. The division operation is generally very time consuming and employs a bit serial at a time and involves relatively little logic other than an adder which would be used in a subtract or add mode.

Based on such prior art devices, it is seen that one requires a large piece of logic. Typically, the multiplier configuration is the largest circuit component, while the shift logic being smaller but also comprising a substantial amount of logic elements. The adder is typically comparable in logic size to the shifter and no defect is permissible in any of this logic. If a defect exits, the chip is completely unusable. Furthermore, the number of bits in the mantissa and the number of bits in the exponent are fixed by the design of the chip. Hence many chips can support the IEEE floating point standard which provides three word lengths of 32 bits, 64 bits and 80 bits. No other word sizes are supported. Generally, it is important to note that the processing speed of these various chips is relatively fast wherein a multiplication for example can be performed in a single operation possibly in the order of a few hundred nanoseconds for a 24-bit by 24-bit multiply as in the case of single precision floating point.

The method and apparatus that will be described in this application is appreciably more time consuming requiring on the order of 100 nanoseconds per step, but it is completely fault tolerant. As will be further explained, another feature of the design is that the floating point structure logic and fixed point logic are implemented into the same structure whereas prior art floating point chips generally only support floating point operation and do not support Boolean operations. The design described will support floating point, fixed point and Boolean operations.

BRIEF DESCRIPTION OF THE INVENTION

A multiplicity of single bit cells is provided. Each cell includes a multiport RAM, programmable logic arrays which implement the control logic, plus path logic which provides the communication between neighboring cells. In order to command a particular one-bit processor to perform as a particular bit in a floating point word, a multiplicity of slice types is defined. As will be seen, the floating point implementation to be described requires 15 slice types to handle all different combinations of bit operations that must be performed. The logic is such that defective one-bit processors appear invisible so that data can flow across them without interference. Eliminating defective cells allows for complete economy in providing a very powerful chip although there is a slight performance degradation which is typically a few nanoseconds in regard to a propagation delay time.

As will be explained, each chip which is employed in the invention may typically have defective cells. For example, in the case of a chip with 20 cells, one would typically desire that no more than four cells are defective. Thus in order to perform a 32-bit operation, two chips, each containing at least 16 good cells, can be implemented to operate together. Essentially, as will be described, the invention relates to the details of the slice types and the path logic that is required to implement floating point arithmetic in regard to cell configurations wherein only operational cells are employed to perform functions, while defective cells are eliminated or made invisible.

Hence it is an object of this invention to obtain a multiple-bit processor which may perform any combination of fixed point arithmetic, floating point arithmetic and Boolean operations and by structuring such a processor from a multiplicity of integrated circuit chips which can be interconnected to form the required bit processor independent of the fact that there are defective cells on each of the component circuit chips.

BRIEF DESCRIPTION OF THE FIGURES

FIG. 5 is a Table depicting the slice types which can be accommodated by the circuitry of this invention.

FIG. 22 is a path usage diagram showing a floating multiply intermediate operation (FLTMI).

DETAILED DESCRIPTION OF THE INVENTION

Figure 1:
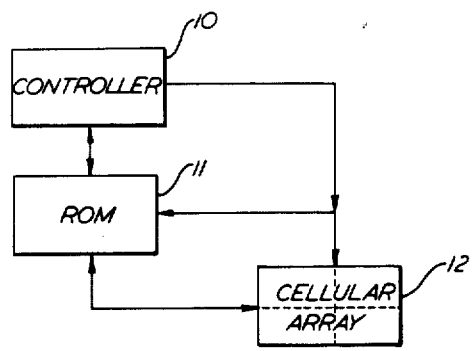
FIG. 1 is a system block diagram showing a cellular array according to this invention.

Referring to FIG. 1, there is shown a typical system block diagram. Essentially, the simple block diagram depicts a controller 10 which is typically a micro-program sequencer. The controller 10 is coupled to a ROM 11. The ROM which is a Read/Only Memory operates to store micro-instructions for controlling the various cells in the cellular array 12. The controller 10 is of ordinary design as typically would be found in many applications. An aspect of the present invention is the techniques of controlling the cellular array 12 by means of the micro-instructions which are stored in the ROM 11. The micro-instructions drive a multiplicity of one-bit cells which are contained in the cellular array 12, as will be further explained. In order to achieve reasonable word size such as a 32-bit word, one would require at least 32 working cells plus some number of spares. Therefore, for present purposes, the cellular array 12 may contain 40 cells which cooperate together. It is understood at the onset that these cells do not have to comprise any particular row or column structure. It is, therefore, immaterial whether or not the 40 cells comprise one or more rows of an array processor since the row structure of such processors is not important to the present invention.

It is also immaterial as to how many chips it takes to implement the 40 good cells since the interconnection between these cells is insensitive to the placement of chips. Therefore, it is understood that the cellular array 12 may comprise a plurality of individual chips each having a number of effective cells with a number of defective cells. Thus according to prior art techniques as those for example described in the above noted co-pending application, entitled AN ARRAY RECONFIGURATION APPARATUS AND METHODS PARTICULARLY ADAPTED FOR USE WITH VERY LARGE-SCALE INTEGRATED CIRCUITS, good cells can be utilized to perform floating point arithmetic operations according to this invention based on the cell structure and control of the same.

It is understood that the performance essentially would decrease regarding the number of chip boundaries that are crossed in order to implement a 40-cell system or to obtain for example operation on a 32-bit word. Essentially, as will be explained, if the cellular array 12 has an assortment of defects, it means that different data bits would be stored at different bit positions in the memory or in each cell.

In any event, what is important is that a particular bit in the memory contains a particular bit for the processor and this is how this system operates.

Figure 2:
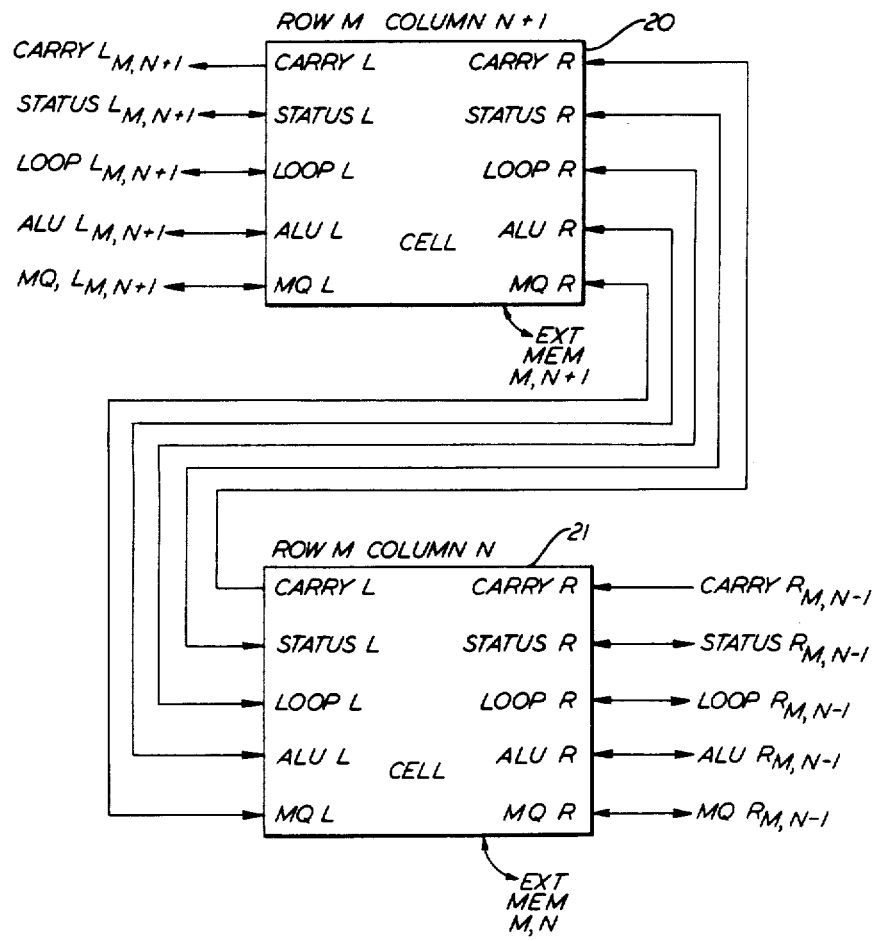
FIG. 2 is a schematic showing the horizontal interconnections between cells in an array.

FIG. 2 depicts the horizontal interconnection between individual cells as cell 20 and cell 21. These interconnections are five in number. Essentially, each cell is connected by five arithmetic paths. The paths are designated respectively as the Carry, ALU, MQ, Loop and Status Paths. Hence the left side of the cell 21 has the left signals and the right side of the cell 21 has the right signals. In this case the left edge of cell 21 is connected to the right edge of cell 20. It is noted that the Carry path, unlike the other four paths, is a unidirectional path being from right to left.

The purpose of the five arithmetic paths and their function in regard to processing cells as 20 and 21 has been described in the co-pending application entitled ASSOCIATIVE ARRAY WITH FIVE ARITHMETIC PATHS, Ser. No. 473,362. As explained, the implementation of dynamic word size configuration realizes that only five horizontal paths between adjacent cells are required to support an extensive instruction set. Thus as shown in FIG. 2, the Carry path propagates the arithmetic Carry from the ALU Carry output of each cell to the left or essentially moves the Carry from the right to the left. The Carry, as indicated above, is a uni-directional path being from right to left. The ALU path moves a bit from one cell to the next. The movement may be to the left, to the right, from the right to the left or from the left to the right.

The typical input to this path, as will be shown, is the ALU C bus which is the ALU output and the typical destination is the multiport RAM or MPR which is employed in each cell. The MQ path which stands for Multiplier/Quotient moves a bit from one cell to the next. The movement may be to the left or to the right, from the right to the left or from the left to the right. The typical input to this path is the MQ flip-flop which also will be explained in regard to FIG. 3, and the typical destination is the MQ flip-flop. The Loop path serves to move a bit from one cell to the next. The typical input to this path is the ALU C bus which is the ALU output and the typical destination is the MQ flip-flop. This path usually provides end-to-end coupling in double word operations as was explained in the above noted co-pending application. The Status path serves to move a bit from one cell to the next. The movement may be to the left, to the right, from the right to the left, or from the left to the right.

The typical input to the path is the ALU D bus and the typical destination is the set of Status flip-flops. Unlike the other paths where a single flip-flop is the usual destination, the Status path is widely used, as will be explained further.

Figure 3B:
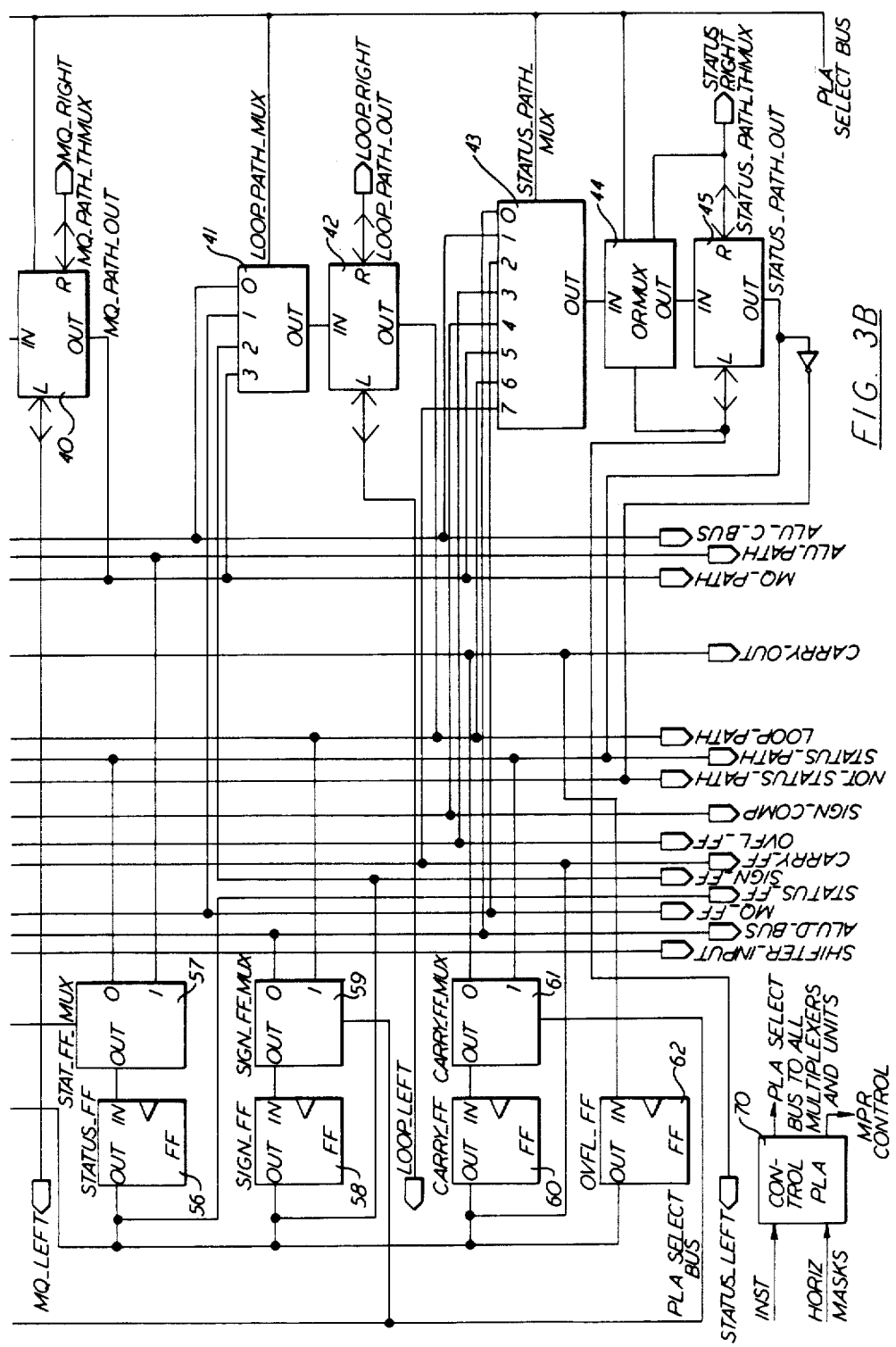
FIG. 3, comprising of FIGS. 3, 3A, and 3B, is a detailed block diagram of a cell as employed in an array.

Referring to FIG. 3, there is shown a detailed block diagram of a typical processing cell employed according to this invention.

The cell is composed of three main units, a first unit being a multiport RAM or MPR 30. The RAM, as will be explained, provides a set of registers and is a Random Access Memory. The second unit is the various data paths which include multiplexers for each of the signals. This will also be explained. There is also a control unit 70 which operates to control the cell. The multiport RAM or MPR 30 contains a set of registers which essentially are implemented by memory storage. There are 16 general purpose registers which are used to store data, 8 scratch path registers which are used for the temporary storing of data during various operations. The multiport RAM also contains mask registers as controlled by the mask output of the RAM to specify the slice configuration of that particular cell. Also included in the MPR are special purpose registers.

The configuration and control of a RAM as MPR 30, in performing register functions, is well known. Essentially, various storage locations are used to store data on a bit basis and these memory locations serve as registers. As can be seen from FIG. 3, the MPR 30 has three ports. There are two output ports designated as RAM A and RAM B. They are addressed by the Read Address and the Read/Write Addresses associated with the MPR 30. Thus the RAM A output is addressed by the Read Address and the RAM B output is addressed by the Read/Write Address. The MPR input port designated as Read/Write IN is also addressed by the Read/Write Address. The addressing scheme can therefore support operations of the form A OP B — > B where the Read Address is A and the Read/Write Address is B.

As seen from FIG. 3, the RAM A and RAM B outputs are coupled to respective input ports of the ALU 31. The ALU 31 has a main output which is designated as the ALU C bus. The Carry output (COUT) is connected to an output multiplexer 33 which provides the Carry left signal, as for example that signal shown in FIG. 2. The Carry right signal is directed to one input of an input multiplexer 34 whereby the Carry IN signal from the right cell is directed to the ALU Carry input (CIN). The output of the ALU 31 which is the ALU C bus is connected via a gate 38 to an output multiplexer designated as the ALU D multiplexer 35.

This multiplexer 35 has a plurality of inputs (seven) with one output for providing data to the MPR 30 and to other multiplexers. The multiplexers as 33, 34, and 35 are conventional multiplexers which are well known in the art. Hence a signal at any input can be applied to the output by designating the input on the select line of the multiplexer. The select signal is supplied to all multiplexers via the control programmable logic array or PLA 70. The PLA 70 associated with each cell operates to program the cell so that the proper multiplexer inputs are selected prior to performing an operation. The PLA 70 also provides control for the MPR 30 in defining the mask for the cell, which is derived from the horizontal mask bits applied to the PLA 70.

These bits and the functioning of the same have been described in detail in the above noted copending applications. Essentially, cells are organized into words by the horizontal mask bits as also explained in U.S. Pat. No. 4,546,428. It is again noted that the structure defined in the patent could only perform by the positioning of a word into five implemented slices, while the cell structure and control herein requires 15 slice types to handle all different combinations of bit operations that must be performed. Hence at least four horizontal mask bits are required herein.

The output of the ALU 31 which is the ALU C bus is also connected to one input of an ALU path multiplexer 36 having its output coupled to a transversal horizontal multiplexer which is the ALU path multiplexer 37. As seen from FIG. 3, the ALU left and ALU right signals are under the control of the multiplexer 37 which can thereby direct these signals to the left or the right as above described.

For an example of typical horizontal multiplexer circuitry, reference is made to U.S. Pat. No. 4,546,428 entitled ASSOCIATIVE ARRAY WITH TRANSVERSAL HORIZONTAL MULTIPLEXERS issued on Oct. 8, 1985 to S. G. Morton, the inventor herein, and assigned to the assignee herein. In the patent, there is disclosed various horizontal transversal multiplexers which operate in conjunction with a processing array. The transversal horizontal multiplexer constitutes apparatus which allows great flexibility concerning data flow through the processor cell. As explained in the patent, the multiplexing includes means for transferring data in a right or a left direction from cell to cell and further includes means for bypassing any cell to increase the flexibility of the associative array. Essentially, the multiplexer as 37 has four signal nodes where each provides a signal bit path and has control inputs with a left signal node (L) connected to the right signal input (R) of a left neighboring processor cell and with the right signal node (R) connected to the left signal input (L) of a neighboring processor cell in the array.

One of the nodes constitutes a data input node (IN) and the other node is data output node (OUT). Based on the structure of the multiplexer, data can flow in any direction between the four nodes as from left to right, right to left, both from the signal nodes and between the data input and output nodes. Essentially, the module 37 performs exactly in this manner. Control of the transversal horizontal multiplexer 37 is afforded by the control PLA 70 via the PLA select bus. The output of the transversal horizontal multiplexer 37 is coupled via an output lead to one input of multiplexer 35 and is further distributed to other multiplexers in order to allow the ALU path output signal which is the output of multiplexer 37 to be distributed to the proper locations as required during system operation.

It is also understood that multiplexer 35 is a conventional multiplexer having for example seven input leads and a single output lead, and hence any of the single input leads can be applied to the ALU D bus via the output lead of multiplexer 35. There is also shown the MQ path multiplexer 39. The MQ path multiplexer 39 is a dual input multiplexer with a single output, and essentially the output of multiplexer 39 is directed to a transversal horizontal multiplexer 40 for the MQ path which functions in the same manner as multiplexer 37 but provides the MQ right and MQ left signals as for example shown in FIG. 2. A 4-input multiplexer 41 is designated as the Loop path multiplexer and has its output connected to an associated transversal horizontal multiplexer 42 for controlling the Loop path as shown in FIG. 2 in both the right and left directions.

Finally, an 8-input multiplexer 43 furnishes various inputs to the Status path. The output of multiplexer 43 is directed to a OR multiplexer 44 which has its output coupled directly to the transversal horizontal multiplexer 45 for controlling this Status path signal in either the right or the left direction. Essentially, as also shown in FIG. 3, there is an MQ flip-flop 50 which is associated with each cell and which is controlled by means of a 8-input multiplexer 55 to direct signals to the MQ flip-flop 50. There is a Status flip-flop 56 associated with a 2-input multiplexer 57 for controlling input signals to the Status flip-flop. There is a sign flip-flop 58 which is controlled by a 2-input multiplexer 59 as well as a Carry flip-flop 60 controlled by a 2-input multiplexer 61. An overflow flip-flop 62 is also shown. As seen, the overflow flip-flop 62 has its input controlled by the overflow output of the accumulator 31.

Essentially as seen from FIG. 3, the numerous connections between each of the individual modules as above described are shown in detail in FIG. 3 and it would be superfluous to describe each and every connection in association with FIG. 3. In any event, certain factors concerning FIG. 3 should be of further interest.

As indicated above, the MPR 30, in addition to the main ports described, has some special purpose registers which have their own dedicated inputs and outputs. For purposes of the present disclosure, the special registers that are of relevance for the floating point operations to be described are the Status register and the MQ register. The status register essentially consists of the Status flip-flop 56, the Sign flip-flop 58, the Carry flip-flop 60 and the Overflow flip-flop 62. The MQ register essentially consists of the MQ flip-flop 50 and the associated MQ flip-flop multiplexer 55.

Instructions are provided for controlling the writing of data back into the registers, as will be further explained. The possibilities are as follows:
1. Load Addressed register only
2. Load Status register only
3. Load Addressed register and Status register
4. Load dependent on Status flip-flop or not Status flip-flop
5. Load dependent on Sign flip-flop or not Sign flip-flop As seen in FIG. 3, there are many data paths which include the so-called uni-directional Carry path which has the Carry right input directed to the zero input of multiplexer 34 and the Carry left output emanating from multiplexer 33. This Carry path as indicated is a unidirectional path. The remaining paths as the ALU, MQ, Loop and Status paths are bidirectional.

As indicated above and as shown in FIG. 2, all of the paths interface to the neighboring left and right cells. The ALU 31 is a 16-function ALU that adds, subtracts and provides various logic operations. Examples of such devices are well known in the art. As mentioned above, the ALU 31 receives it operands from the MPR 30. The Carry IN signal may come from the right enable or may be internally developed. This is provided by means of multiplexer 34 where the zero input is from the neighboring cell while the number 3 input or top input comes from the circuits on the chip. The Carry OUT signal or Carry left signal passes to the left neighbor. The ALU supports the following operations.
1. Zero
2. One
3. A Plus Cin (Pass A if Cin=0)
4. B Plus Cin (Pass B if Cin=0)

5. A Plus B plus Cin
6. A Minus 1 plus Cin
7. A Minus B plus Cin−1
8. B Minus A plus Cin−1
9. Not A
10. A or B
11. A and B
12. Not A and B
13. A nor B
14. A NAND B
15. A XOR B
16. A XNOR B As indicated, the other arithmetic paths are bidirectional. That is, each bidirectional path can receive both input and/or output and transmit it to the left or to the right. The output signals can either come from an internal cell signal or bypassed from the other side (Left/Right). This is shown in regard to the ALU right and ALU left paths which are associated with the transversal horizontal multiplexer 37 and the dual multiplexer 36. As one can see, the ALU path and the MQ path are similar in configuration. The Loop path has a 4-input multiplexer 41 directed to a single output and is also associated with a transversal horizontal multiplexer 42. In any event, the Status path is different from the other paths in that an ORing function can be performed on the internal signal and the input path before output to the other side. This is done by the OR multiplexer 44.

The different signals that can be used as input or output to the different paths as indicated are shown in the schematic of FIG. 3. In any event, there are other functions which are performed in each cell such as the shift function. The shift function enables shifting of data from the coupled multiplexing upon a shift command which may be internal or external to the chip. As seen, a shift input multiplexer 65 is shown having two inputs and a single output which is directed to the ALU D multiplexer 35 and the MQ flip-flop multiplexer 55, with the output of multiplexer 65 designated at SHIFTER INPUT.

All inputs and outpus are shown on the cell in regard to the schematic of FIG. 3. The reason for the various combinations of inputs and outputs will be discussed later. There is also shown a control unit 70. Control logic which is implemented as a Programmable Logic Array PLA 70 essentially determines the flow of data through the data paths based on the instruction in the slice configuration.

This relates to the mask register state of the cell. In addition, the operation of the ALU 31 is determined based on the state of the Status flip-flop 56 of each cell. Hence the control logic essentially performs control by sending proper signals to the MPR control input as well as interfacing with various other inputs as shown by the arrow designated on the control unit 70.

Figure 4A:
FIGS. 4A to 4I are a series of diagrams representing floating point number formats according to this invention.
Figure 4B:
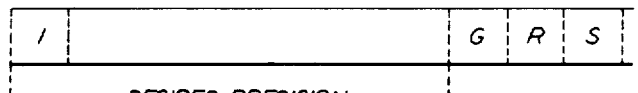

The floating point format in slice type is depicted in FIGS. 4A through 4H. Referring to FIG. 4A, there is shown the floating point format that is implemented as the IEEE 754 standard. The data format is made up of three parts, the sign bit (S), the biased exponent (E), and the mantissa (M). The mantissa is represented by a sign magnitude notation with an implied leading 1 (hidden 1) and an implied binary point to the right of the hidden 1. In addition, rounding mode are specified in the standard, and the implemented mode is the "IEEE biased rounding to nearest" mode with rounding to even in cases of a tie. Also extra precision is required during internal arithmetic operation. The required precision bits are shown in FIG. 4B where G equals the guard bit, R equals the round bit and S equals the sticky bit.

Figure 4C:
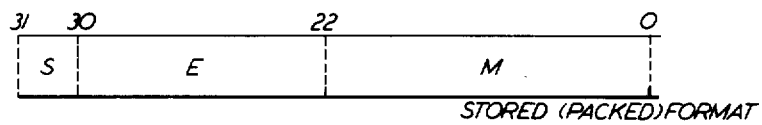
Figure 4D:
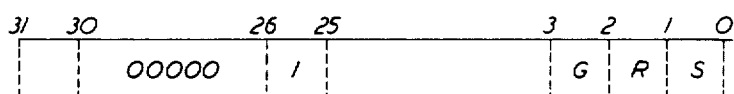
Figure 4E:
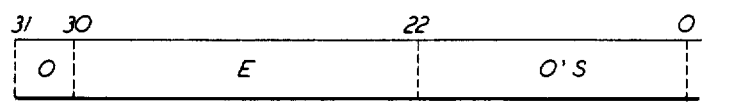

Referring to FIGS. 4C, 4D, and 4E, there are shown examples of representations of a 32-bit floating number. FIG. 4C shows the stored packed format. Essentially, as seen from FIG. 4C, there are 32 bits with bits 30 and 31 representing the sticky bits, bits 22 to 30 representing the exponent, with bits 0–22 representing the mantissa. Referring to FIG. 4D, there is shown the internal mantissa with bits 0–3 designated as the GRS bits and bits 26 to 30 being the internal mantissa bits. FIG. 4E specifies the internal exponent. As can be seen, bits 0–22 are all zeros with bits 22–30 designating the exponent. During this condition, bits between 30 and 31 are zeros. Data path circuitry which is configured for 32 bits according to this invention is able to handle all three representations. The different bit slices used are shown in FIGS. 4F to 4H.

Figure 4F:
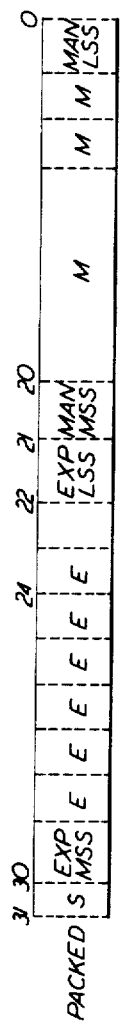
Figure 4G:
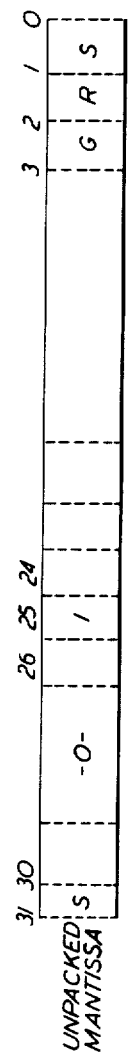
Figure 4H:
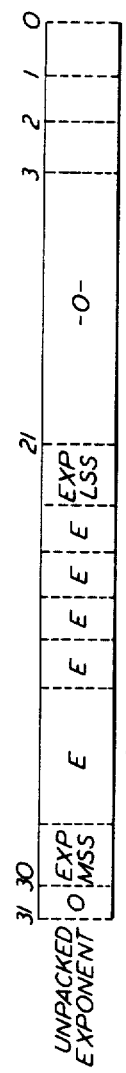

As can be seen from FIGS. 4F to 4H, the different bit slices correspond to their location in a word. Thus FIG. 4F shows a packed word with the different bits indicated. FIG. 4D shows the unpacked mantissa, while FIG. 4H shows an unpacked exponent. In addition to the floating point formats, the data paths are able to support integer operations and thus integer formats.

Figure 4I:
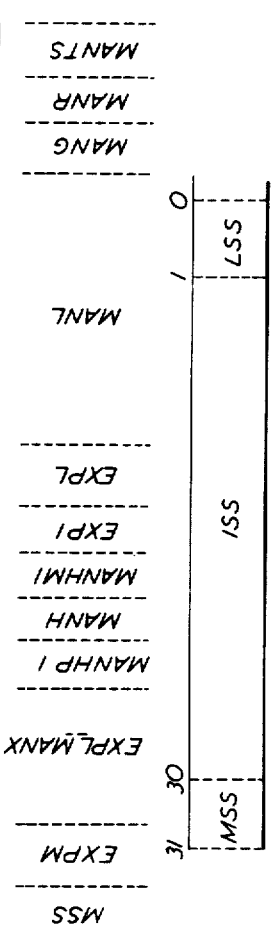

For completeness the integer representations are shown in FIG. 4I for a 32-bit number. It is understood that the term LSS stands for least significant slice, the term ISS stands for intermediate significant slice, while the term MSS stands for most significant slice.

Referring to FIG. 5, there is shown a Table of the slice types. As seen from FIG. 5, there are 13 slice types. Each particular slice contains a mantissa, exponent and integer bits also determining whether or not it is a least significant slice, an intermediate significant slice, or a most significant slice as in the case of the Sign slice. Two additional slice types are also employed but not shown in FIG. 5. These are the Inactive slice which causes a cell to have its storage frozen and to be horizontally invisible to allow data to pass through the cell without modification. The horizontal skip slice causes a cell to be horizontally invisible but allows the storage to be updated. The horizontal skip slice is useful when one wants to replicate a bit in a number of slices, such as for sign extension. A cell has the capability to behave as any slice type. At start-up the different cells are configured to a specific slice type based on the cell's bit's locations relative to the whole word. The different slices behave differently for the same instruction, although the different slices must be able to communicate and work coherently with each other slice. This is necessary so that the whle word performs the desired operation for a given instruction. There are a number of different microinstructions which are supported such that the floating point operations can be implemented by proper microprogramming. Examples of micro-programs to support the following operations are as follows:

Add
Subtract
Multiply
Divide
Conversion from floating point to integer format
Conversion from integer to floating point format The micro-instruction is able to support other complex floating point operations like square root and the hyperbolic function. Examples of different microinstructions will be given. In order to fully understand the nature of operation, the following description describes a floating point add and multiply operation.

The implementation using the different slice types and word format described above for both floating point add and multiply is described in this section.

A. The major phases of the floating point add is shown below. The numbers to be added are in IEEE format and the result will also be in IEEE format.

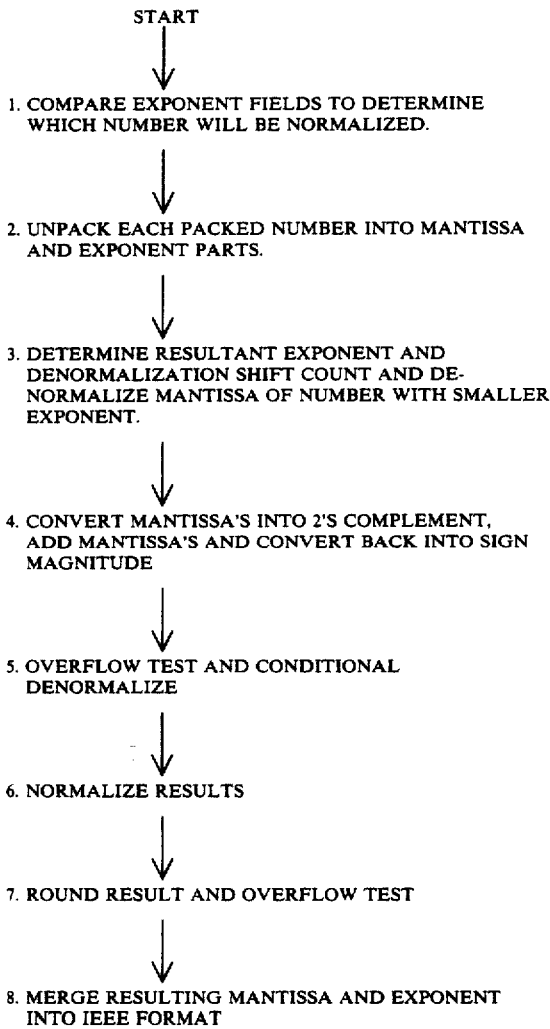

The above sequence only shows the phases involved for "normal" addition operation. For simplicity, actions of error conditions such as exponent overflow are not shown. Error conditions would be handled by additional microcode. Furthermore, it shows worst case "normal" condition and the sequences are not optimized for scalar operations (i.e., results that have to be normalized do not have to check for mantissa overflow). It should be noted that in an array of these arithmetic elements, multiple floating point additions are done concurrently, hence worst case conditions are more like to occur.

The different phases and the instructions provided to implement the phases are described in more detail below.

When adding two floating point numbers, the number with the smaller exponent will have to be denormalized. The FLTSE (Flt packed format and a conditional PSWAP is used to sort the numbers. The FLTSE and PSWAP is described next.

FLTSE (A, B) FLT. Subtract Exponent

The exponent bits (EXPL to EXPM) of word A are subtracted from the exponent bits of word B. Both A and B are in packed format (FIG. 4F). The comparison result of the operation, which is dependent on the relative size of Aexp and Bexp, is sent to all slices. The status bit is derived from the overflow of the MSS bit since this bit acts as a sign extension for the subtraction (Mantissa and MSS does a zero operation). The status flip-flop = 0 if Aexp > Bexp and is equal to 1 if Bexp > Aexp. Only the status register would be enabled by the microprogram.

Register Usage:
  A — Read
  B — Read/Write
ALU Usage:
  B Minus A for Exponent (EXPM — EXPL)
  Zero for the other
Path Usage:
  Status — Distribution of exponent list FIG. 6 shows the path usage for the FLTSE (Floating Subtract Exponent) operation.

Figure 6:
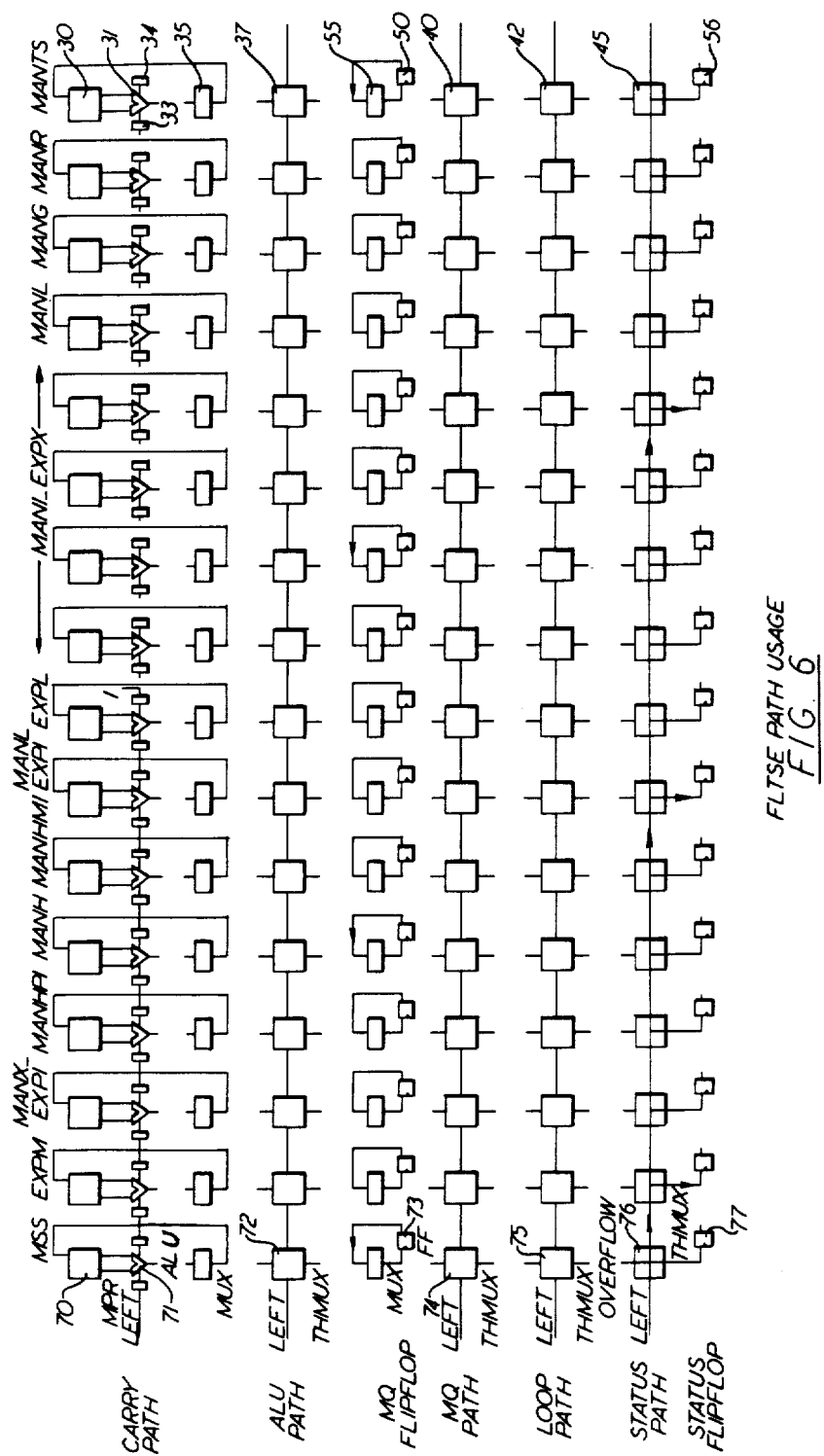
FIG. 6 is a path usage diagram showing a floating subtract exponent operation (FLTSE).

As seen from FIG. 6, there is shown in schematic equivalent form 16 cells whereby each of the cells is responsible for the particular slice as indicated above the same.

Referring to FIG. 6, at the left-most corner there is shown a cell arranged vertically. The cell has the notation MSS indicated above it which stands for the most significant slice. Essentially, the cell contains an MPR 70 which is completely analogous to the MPR 30 of FIG. 3. The MPR is coupled to the ALU 71 which is analogous to ALU 31 of FIG. 3. There is a transversal multiplexer shown which is multiplexer 72 which is analogous to multiplexer 37 of FIG. 3. This multiplexer determines the ALU path. There is shown the MQ flip-flop 73 which is analogous to the MQ flip-flop 50 of FIG. 3 together with its associated multiplexer 74 which is the MQ path multiplexer 40 of FIG. 3. There is shown the Loop path multiplexer which is multiplexer 42 of FIG. 3 and is designated in FIG. 5 as multiplexer 75. There is also shown the Status path multiplexer 76 analogous to the multiplexer 45 of FIG. 3 and the status flip-flop which is designated as 77 in FIG. 6 analogous to flip-flop 56 of FIG. 3.

For convenience sake, the right most cell which has the legend MANTS above it has reference numerals corresponding to those numerals of FIG. 3. Thus as shown in FIG. 6, in this particular configuration, the MQ flip-flop 73 has its output coupled directly back to the MQ multiplexer 55. As shown in FIG. 3, the output of the MQ flip-flop is, in fact, directed to input 1 of multiplexer 55. The various other path configurations are exactly shown in FIG. 6 to support the FLTSE path usage.

Figure 7:
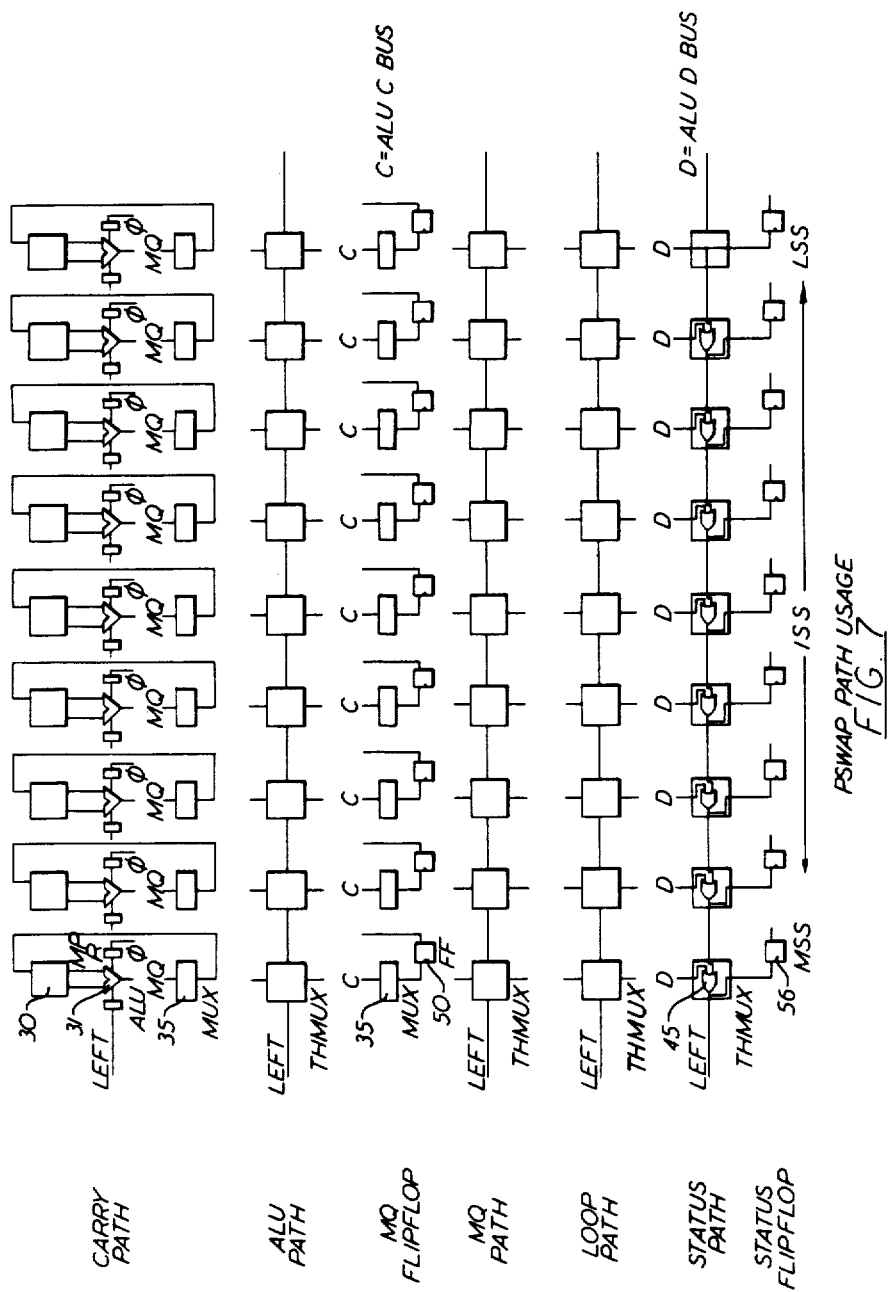
FIG. 7 is a path usage diagram showing a parallel swap operation (PSWAP).

Referring to FIG. 7, there is shown a parallel swap (PSWAP) path usage where the contents of A are swapped with the contents of B. To do this, the contents of A which are stored in the MPR 30 are moved into the MQ register and the contents of MQ are moved to the B register in MPR 30. The entire action to be described is done simultaneously. Thus in FIG. 7 the MQ output is coupled to the MPR input via the multiplexer 35. The output of multiplexer 35 is the ALU D bus. The output of the ALU D bus is checked for zero and then passed to the MPR 30 for storage at the B address. The ALU D bus is checked for zero by the status path.

Register Usage is as follows:
A—Read
B—Destination of MQ
MQ—Destination of A
ALU Usage
Pass A
Path Usage
Status—zero check Hence according to the above, the A register in the MPR 30 is read via the Read Address. The contents of A are passed through the ALU 31 to the ALU C bus and stored in the MQ flip-flop 50 via the MQ FF multiplexer 55. The contents of the MQ flip-flop 50 is moved to the ALU D bus via the ALUD multiplexer 35 and then to the B register in the MPR 30 as selected by the Read/Write Address. The ALU D bus is coupled to the Status path multiplexer 43, where it is directed to the output of the transversal multiplexer 45 to the Status flip-flop 56 via the multiplexer 57. Thus as can be seen, the reference numerals used in FIG. 7 are those of FIG. 3, and this is done for clarity.

It is thus seen that each processor cell can be configured to support the various data transfers based on the ability to direct data via the multiplexers to the various destinations. Each of the following usage diagrams uses appropriate terminology as employed in FIG. 7 as Register Usage, ALU Usage and Path Usage.

The mantissa and the exponent have to be extracted during internal computations. The exponent is extracted first using the FLTME (FLT Move Exponent). This instruction checks if the exponent is equal to zero which signifies an unnormalized mantissa. the FLTFL (FLT Format Left) is used next to extract the mantissa. The FLTME and FLTFL is described below.

Figure 8:
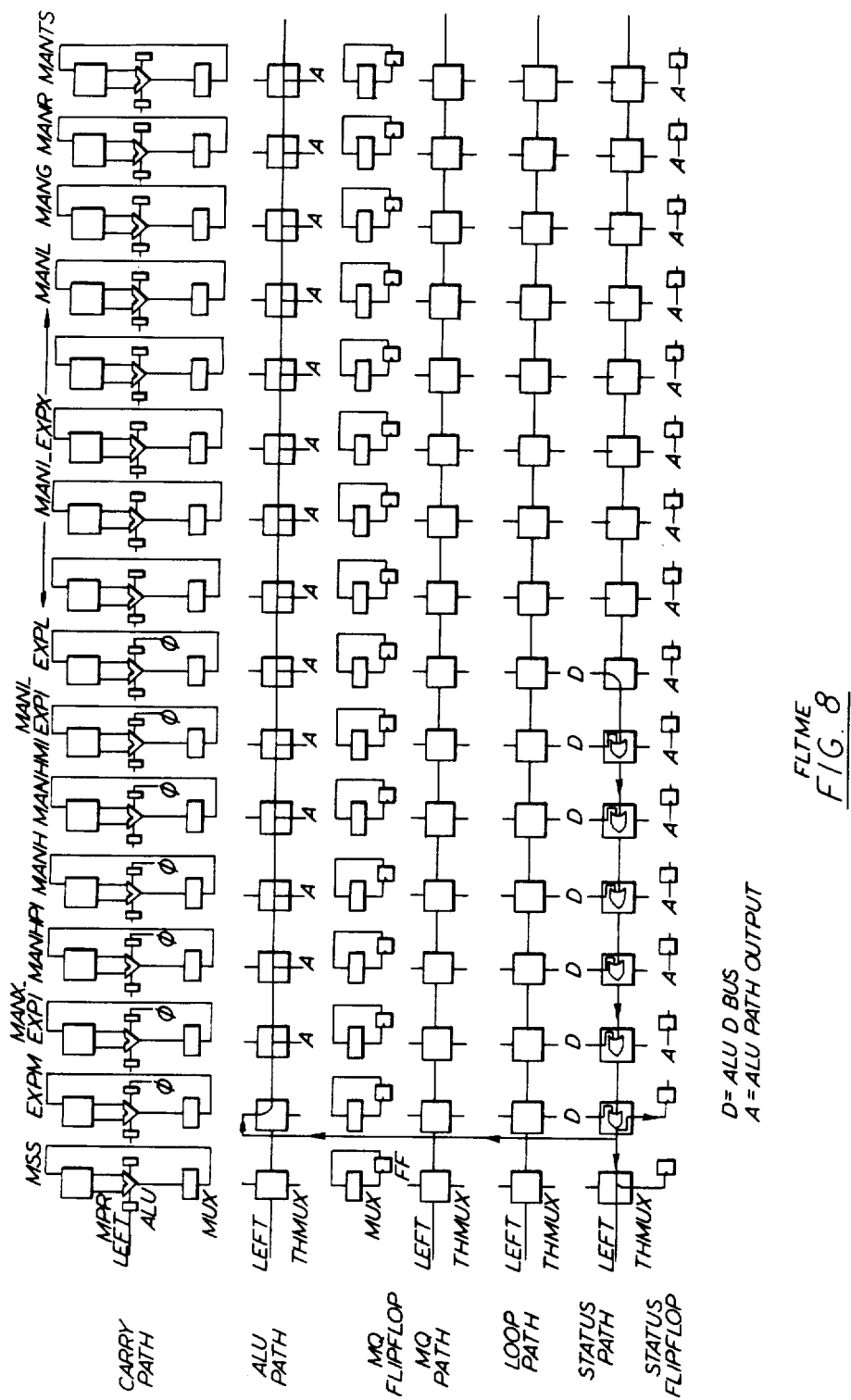
FIG. 8 is a path usage diagram depicting a floating move exponent operation (FLTME).

FIG. 8 shows the FLTME (Floating Move Exponent) path usage. The word (0, Exp 0) is formed from A and loaded into B. The ALU operation for the (EXPM-EXPL) slices is PASS A while all the other slices do a zero operation. In addition a zero check is done for the exponent fields and the result is passed to the status flip-flops of all the cells. Zero checks are performed by using the Status Path Or'ing function where effectively a serial OR of all the exponent bits is done.

Figure 9:
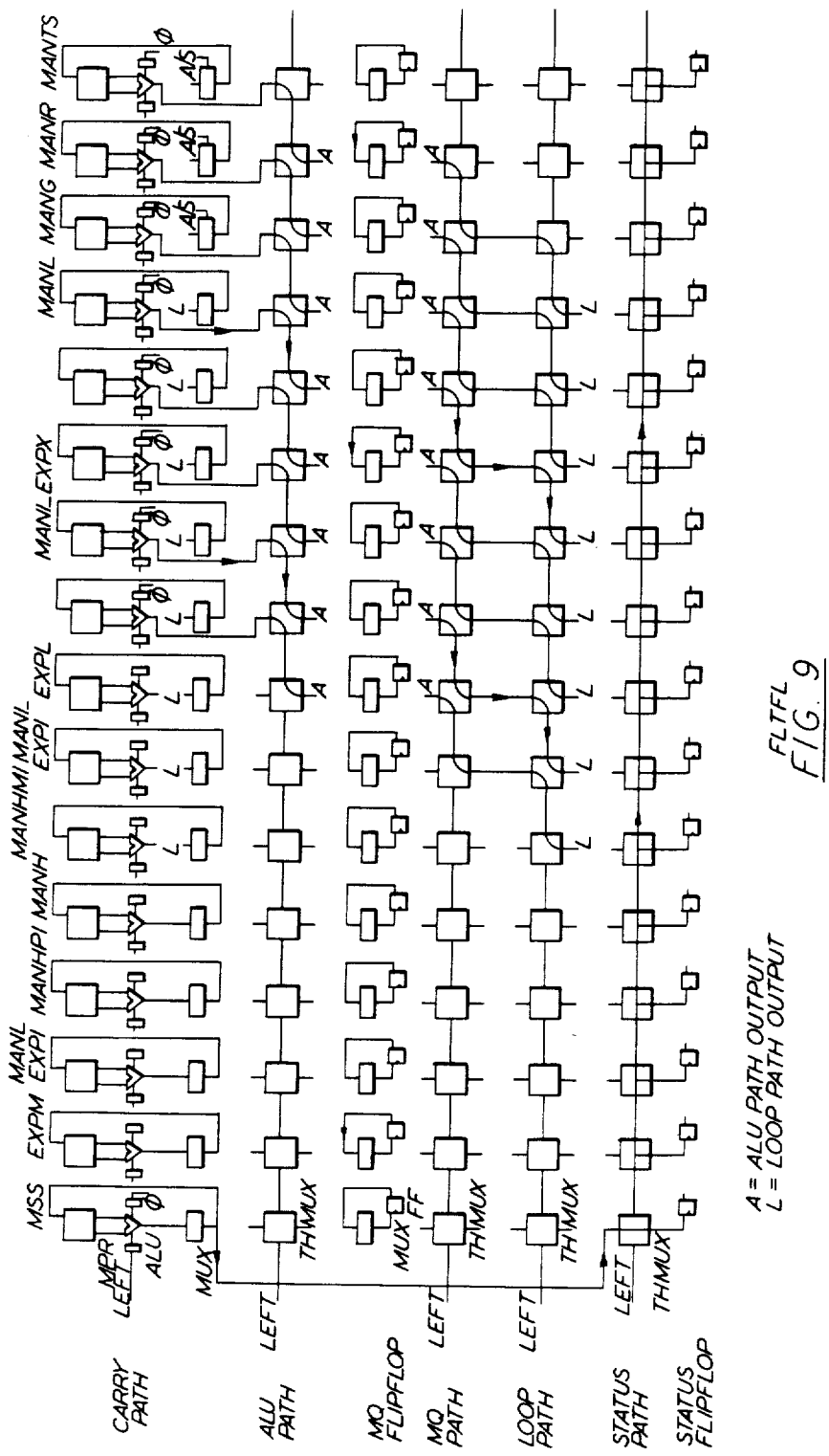
FIG. 9 is a path usage diagram depicting a floating format left operation (FLTFL).

Register Usage:
A—Read=Packed Format
B—Write=Exponent
ALU Usage:
Pass A for Exponent bits
Zero for others
Path Usage:
Status—Zero check over Exponent, transmission to MSS
ALU—Transmission of result of zero check FIG. 9 shows the FLTFL (Floating Format Left) path usage. The mantissa (B) is extracted from a packed format word in A. The extraction process involves the following 1. The mantissa is shifted 3 bits to the left, except for the sign bit. This 3 bit shift leaves room for the Round, Guard and Sticky bit.

2. The Round, Guard and Sticky bits are set to zero.

3. The hidden bit is set to a 1 if the status flip-flop is set (presumably by FLTMG). This is done since the ALU operation is dependent on the status flip-flop for the MANH bit.

4. The bits between sign bit and the mantissa MSB are set to zero. In addition, the sign bit is broadcast to the status flip-flop of all cells.

Register Usage:
A—Read=Packed Format
B—Write=Mantissa
ALU Usage:
Pass A—mantissa bits, sign bit
One Status=1, Zero if status=0 for MANH
Zero=Other Exponent bits
Path Usage:
ALU, MQ, Loop—triple bit shift only for MANHM1—MANT)
Status—Distribution of sign The number with the smaller mantissa has to be denormalized and the shift count is equal to the difference of the exponents. To speed up the denormalization process, both a 1 bit (FloatingSBD) and a 2 bit (FloatingDBD) denormalize is provided. The shift count mentioned above is data dependent but the maximum number of denormalization steps is equal to the number of significant mantissa bits (MANA-MANL) divided by 2 plus 1. Renormalization generally shifts the mantissa to the right while increasing (incrementing) the exponent or shift count. This implies that the initial shift count must be negative and denormalization is finished until the shift count reaches zero. During denormalization, the bits that "fall off" at the right must be ORed with the sticky bit and loaded back into the sticky bit. The mantissa to be denormalized must be loaded in the MQ register.

Figure 10:
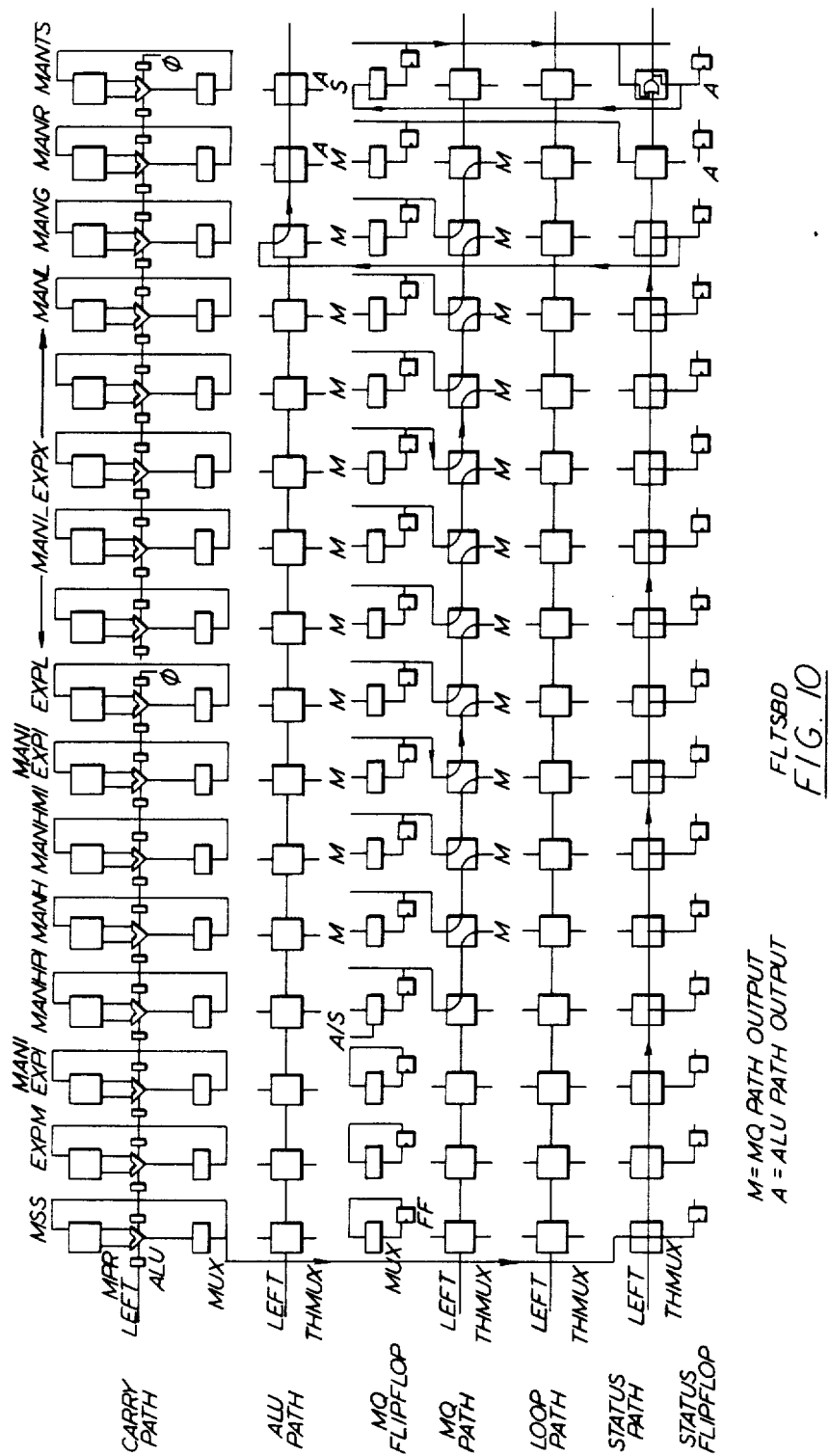
FIG. 10 is a path usage diagram showing a floating single bit denormalize operation (FLTSBP).

FIG. 10, shows the FloatingSBD (Floating Single Bit Denormalize) path usage. The mantissa in the MQ register is shifted to the right and the exponent is incremented by 1. Noting that the exponent or shift count is in exponent format, a constant with a 1 in the EXPL bit which is stored in the scratchpad registers of MPR 31 is added to the exponent. The mantissa sign and unused bits (EXPM—EXPL_MANX) is unchanged and an 0 is shifted in the MANHP1. The sticky bit (MANTS) is loaded from the "OR" between itself and the MANR bit.

The mantissa must be in sign/magnitude form. The new exponent sign is sent to all status flip-flops. The mantissa sign is sent to all sign flip-flops. Storage is enabled only when status is true; i.e., shift count is negative. Pipeline initialization is required, using the instruction with status enabled out RAM disabled.

Register Usage:
A—Constant=1 in EXPL
B—Exponent/shift count
MQ—Mantissa
ALU OP.
A Plus B
Path Usage:
MQ—Mantissa shift right
ALU—Distribution of exponent sign for MANR, MANTS
Status—Distribution of exponent sign (Except for MANR, MANTS) production of sticky bit (MANTS or MANR) using ORing path
LOOP—Mantissa sign distribution.

Figure 11:
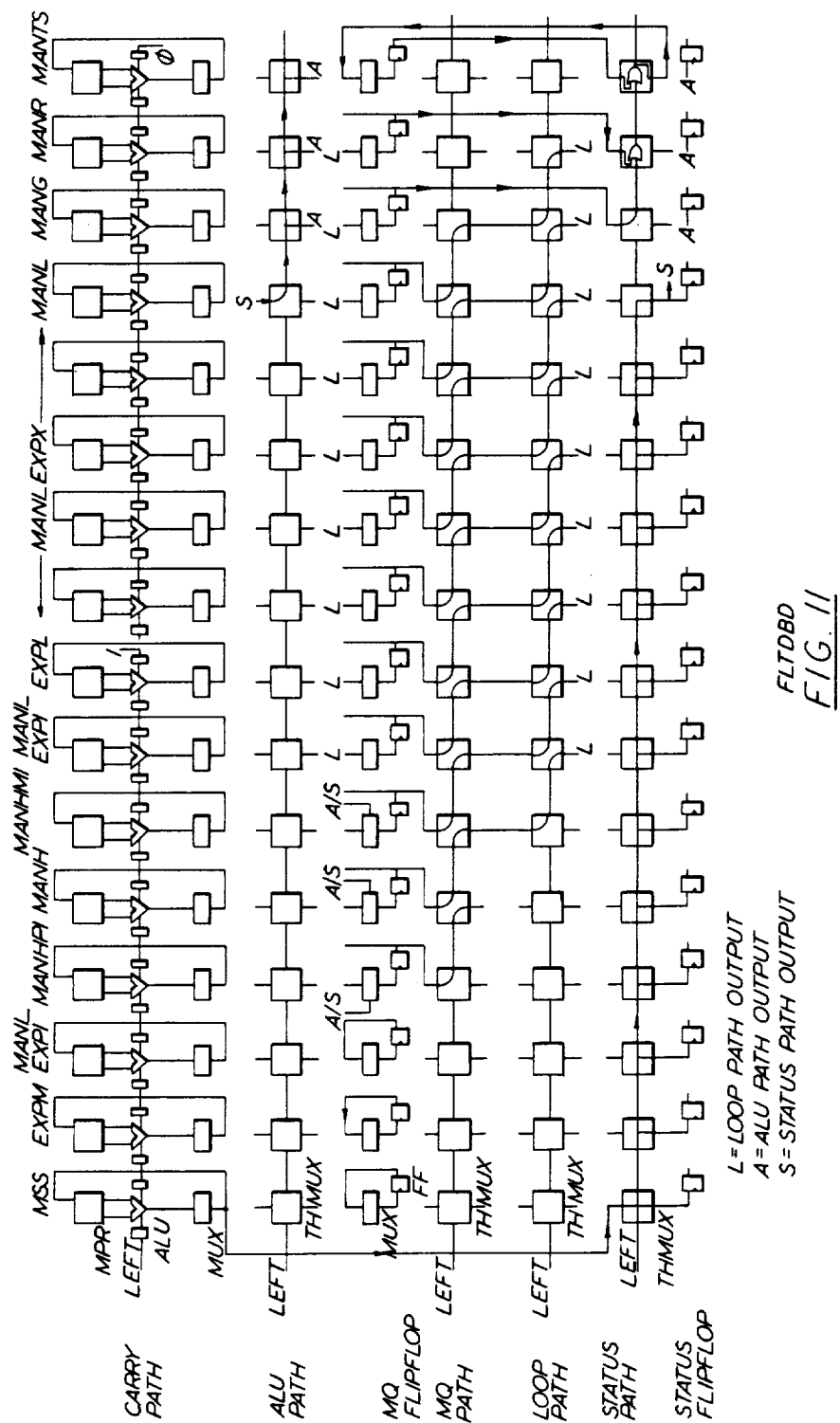
FIG. 11 is a path usage diagram depicting a floating double bit denormalize operation (FLTDBD).

FIG. 11, shows the FloatingDBD (Floating Double bit denormalize) path usage. The mantissa in the MQ register is right shifted by two bits and the exponent is incremented by two. A constant with 1 in the EXPL field is added to the exponent or shift count with the Carry in at EXPL forced at 1. This action results in the effective addition by 2. The mantissa sign, unused bits (EXPM EXPL_MANX) is unchanged and an 0 is shifted into the MANHPL bit. The sticky bit is loaded from the OR of itself, MANR and MANG bits.

The Mantissa must be in sign/magnitude form. The new exponent is sent to status flip-flops. For initial denormalization, storage is enabled only if status is true, i.e., when the shift count is negative. Pipeline initialization is required, presumable using this instruction with status enabled out RAM disabled.

Register Usage:
  A—Constant=1 in EXPL
  B—Exponent
  MQ—Mantissa
Path Usage:
  A Plus B
Path Usage:
  MQ, Loop—Mantissa double shift
  ALU, Distribution of exponent sign for MANG, MANT
  Status—Distribution of exponent sign (except for MANG, MANTS) production of sticky bit by ORing the MANG, MANR and MANT bits The actual addition is using 2's complement format to avoid designing circuitry that can do 4 quadrant adds using sign magnitude format. The mantissa must first be converted into 2's complement from sign magnitude, added, then converted back into sign magnitude. If the sign is positive, the sign magnitude and 2's complement format are the same. If the sign is negative, conversion is achieved by inversion of the mantissa (EXPM—MANTS) while leaving the sign (MSS) unchanged. This is done by just performing a fixed point subtraction although a constant with 1 in the MSS bit and 0 everywhere with the number in sign/magnitude format. This constant is stored in scratchpad.

As it turns out, the same procedure above can be used to convert a negative 2's complement number into sign magnitude. Fixed point overflow will not occur since the (EXPM—MANHP1) bits acts as sign extension bits and thus acts as an overflow buffer. This phase then does not require any special floating point instructions but only fixed point add and subtract.

It is interesting to note that when doing a floating point subtraction, to invert the sign of the number to be subtracted, the above constant can be used by just doing an XOR with the packed floating point number.

The mantissa could overflow during the actual addition or the conversion from 2's complement back to sign magnitude. A mantissa overflow just means that the mantissa significance spills over to the MANHP1 bit from the MANH bit. The Floating OT (Floating Overflow Test) instruction is provided to test this case. All that the instruction does is distribute the MANHP1 bit to the status flip-flop of all cells. A conditional denormalize is done immediately after dependent on the status flip-flop.

Figure 12:
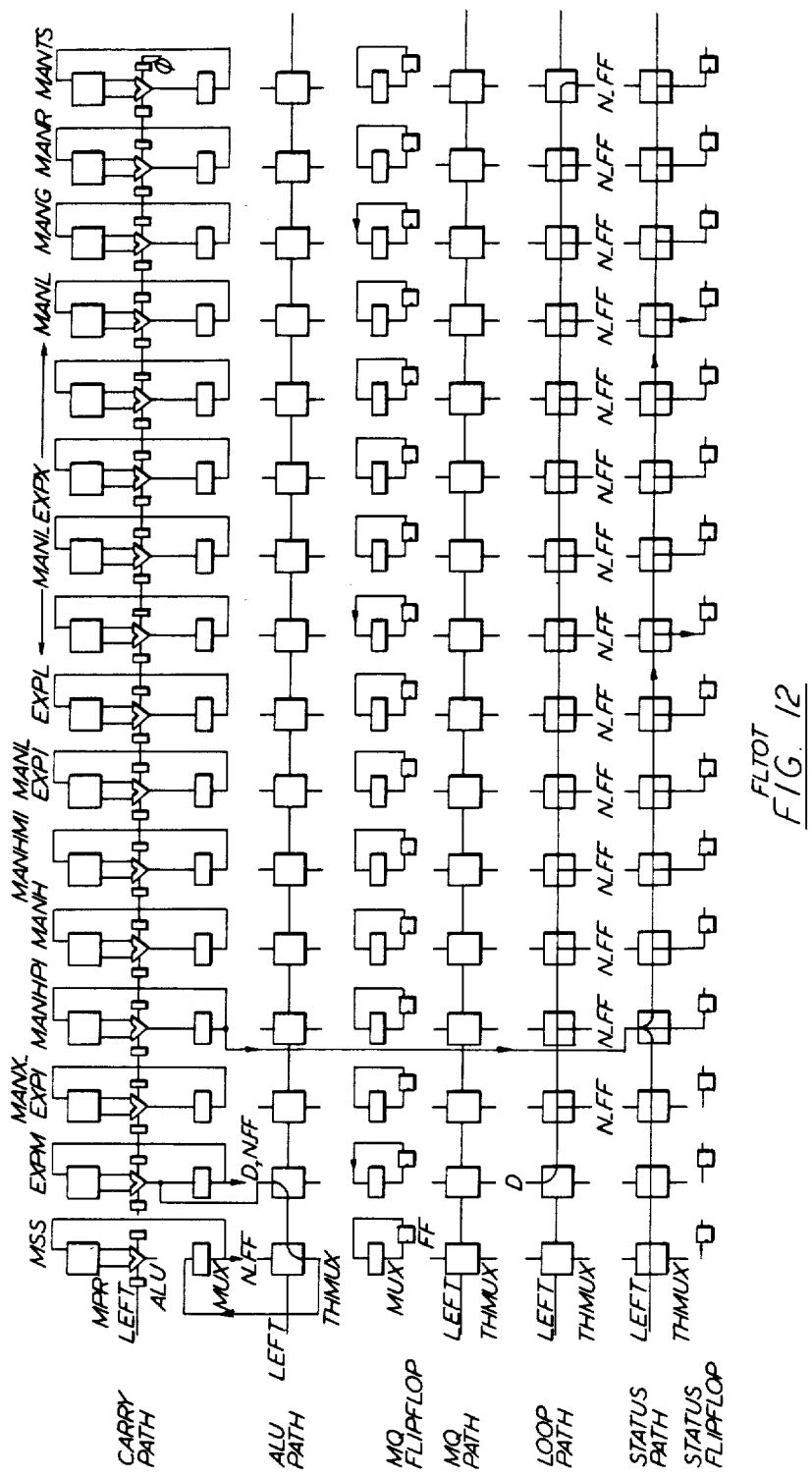
FIG. 12 is a path usage diagram showing a floating overflow test usage (FLTOT).

FIG. 12 shows the FloatingOT (Floating Overflow Test) path usage. The MANHP1 slice is distributed to all status flip-flops to test mantissa overflows from the MANH bit. Only the status should be enabled.

Register Usage:
  A—Read
ALU OP.
  Pass A
Path Usage:
  ALU—transmit the MANHP1 bit to MSS
  Status broadcast MANHP1 from MSS When the two numbers to be added are of different sign, the resulting mantissa may have been to be normalized. To speed up the normalization process, both a 1 bit (FloatingSBN) and 2 bit (FloatingDBN) normalize instructions are provided. These instructions require status register initialization and as such both 1 bit L(FloatingSBNF) and 2 bit (FLoating SBNF) initialization instructions are also provided.

Denormalization generally shifts the mantissa to the left and decrementing the exponent. The mantissa is shifted left by 1 and exponent decremented by 1 during a Floating SBN and shifting of 2 and decrementing by 2 is done during a FloatingDBN. Normalization finishes until the MANH bit equals to a 1 or the exponent equals to a zero which ever comes first. The worst case number of normalization steps equals the number of mantissa bits divided by 2 plus 1. The MANTS (sticky) bit does not participate in the shifting process and remains unchanged as specified in the IEEE standard. The description on the normalize instruction is described below.

Figure 13:
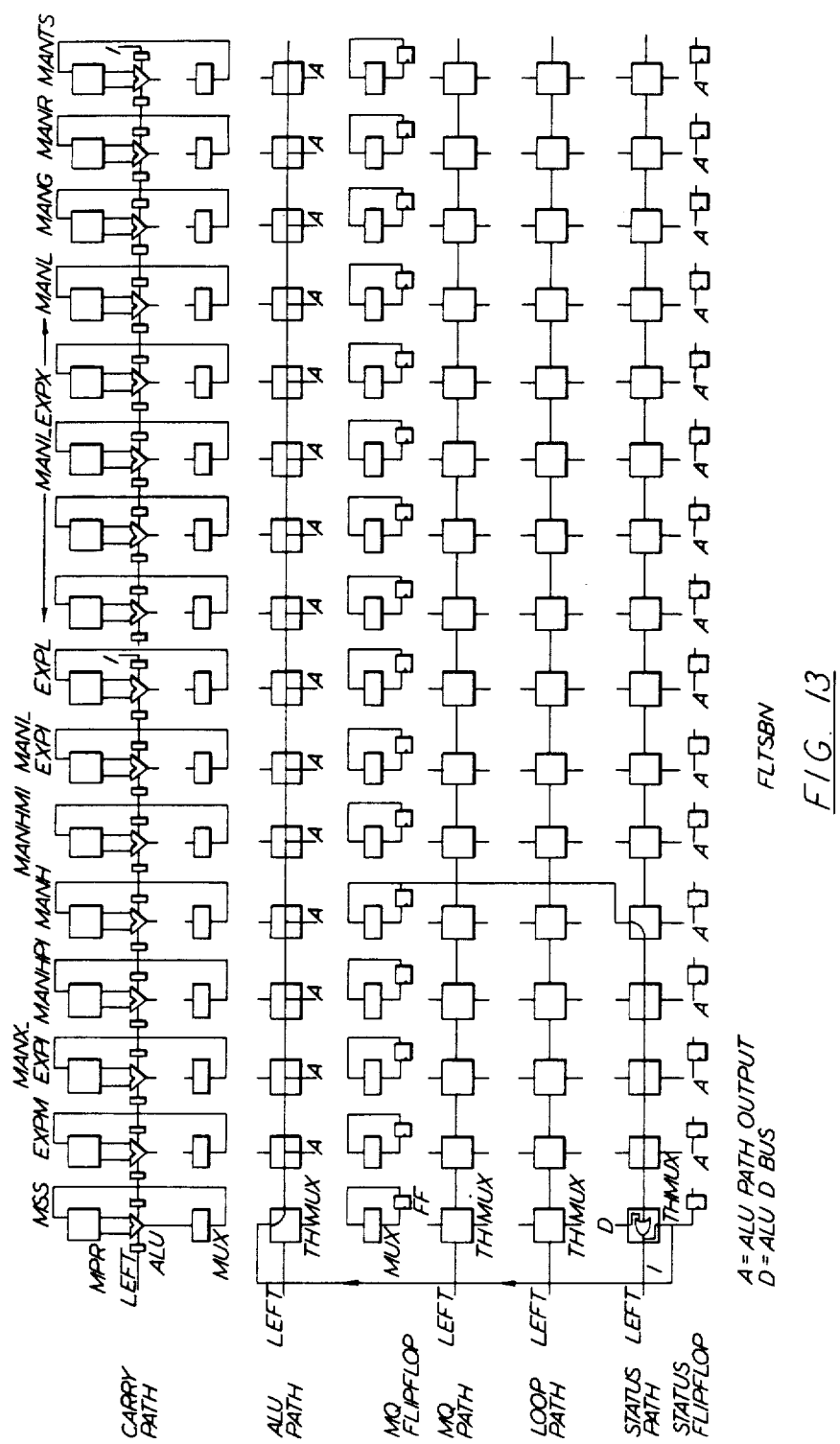
FIG. 13 is a path usage diagram showing floating sign bit normalize operation (FLTSBN).

FIG. 13, shows the FloatingSBN (Floating Sign Bit Normalize) path usage. The mantissa is left shifted by one bit and the exponent is subtracted with a constant stored in scratchpad that has a 1 in the exponent field which results in the exponent being decremented by 1. The mantissa must be in MQ, and the exponent in B. During the shifting process, the sticky part is left alone while shifting in a 0 into the MANR. The "OR" of the new hidden (MANH) bit and the new exponent sign is sent to all status flip-flops to prepare for the next normalization cycle. Storage is enabled only if status is 0 (i.e., if the data is not normalized and the exponent positive. Pipeline initialization is required normally by using the Floating SBNF instruction.

Register Usage:
  A—Constant=1 an exponent field (EXPL)
  B—Exponent
  MQ—Mantissa
  ALU OP: B_Minus_A
Path Usage:
  MQ—Mantissa shift left
  Status—"OR" of (MANH) and exponent sign (MSS)
  ALU—Distribution of status (flow diagram at FloatingSBN)

Figure 14:
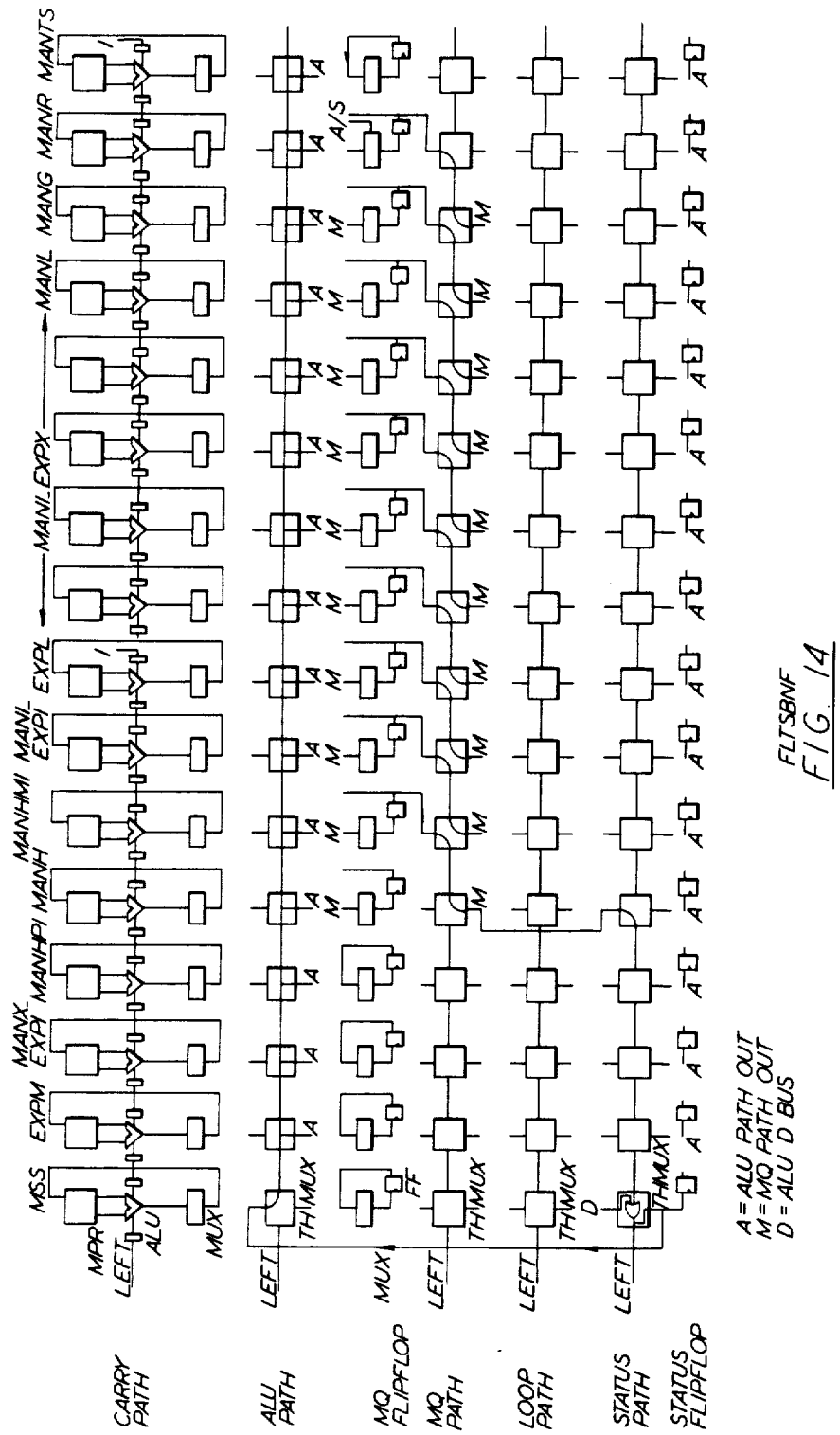
FIG. 14 is a path usage diagram depicting a floating single bit normalize first operation (FLTSBNF).

FIG. 14 shows the FloatingSBNF (Floating Single Bit Normalize First) path usage. The instruction initializes the status register for single bit normalization and is used as a test instruction where only the status is updated. The exponent is decremented by one by subtracting a constant that has a 1 in the EXPL bit. The "OR" of the resulting exponent sign and the MANH is sent to all status flip-flops (i.e., normalize when MANH=0 and exp is not negative.

Figure 15:
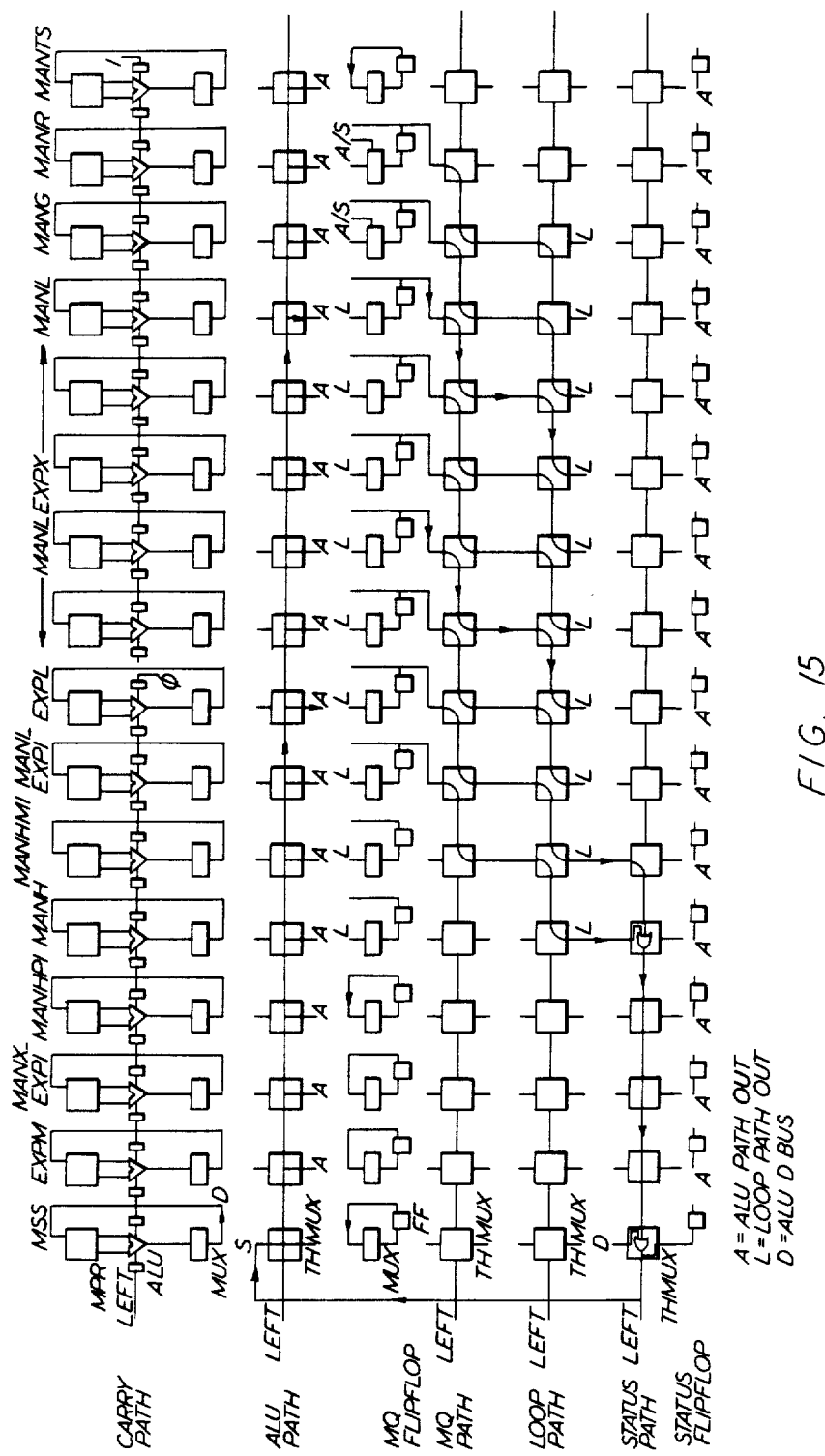
FIG. 15 is a path usage diagram depicting floating double bit normalize operation (FLTDBN).

Register Usage:
  A—Constant=1 in exponent field (EXPL)
  B—Exponent
  MQ—Mantissa
Path Usage:
  Status—"OR" of MANH and exponent sign (MSS)
  ALU—Distribution of status
  ALU OP: B_Minus_A FIG. 15 shows the Floating Double Bit Normalize (FLTDBN (A, B) FLT Double Bit Normalize.

The mantissa is left shifted by two bits and the exponent is subtracted with a constant store in scratchpad that has a 1 in the exponent field and the Carry in at EXPL is forced to a zero which results in the exponent being decremented by 2. The mantissa must be in MQ and the exponent in B. During the shifting process, the sticky bit is left along and a 0 is shifted into the MANR, and MANG bits. The "OR" of the new hidden (MANH) bit, the bit before the hidden bit (MANHM1) and the new exponent sign is sent to all flip-flops to prepare for the ext double normalization step. Storage is enabled only if status is a 0, i.e., if the data is not normalized and the exponent positive. Pipeline initialization is required normally by using the FLTDBNF instruction.

Figure 16:
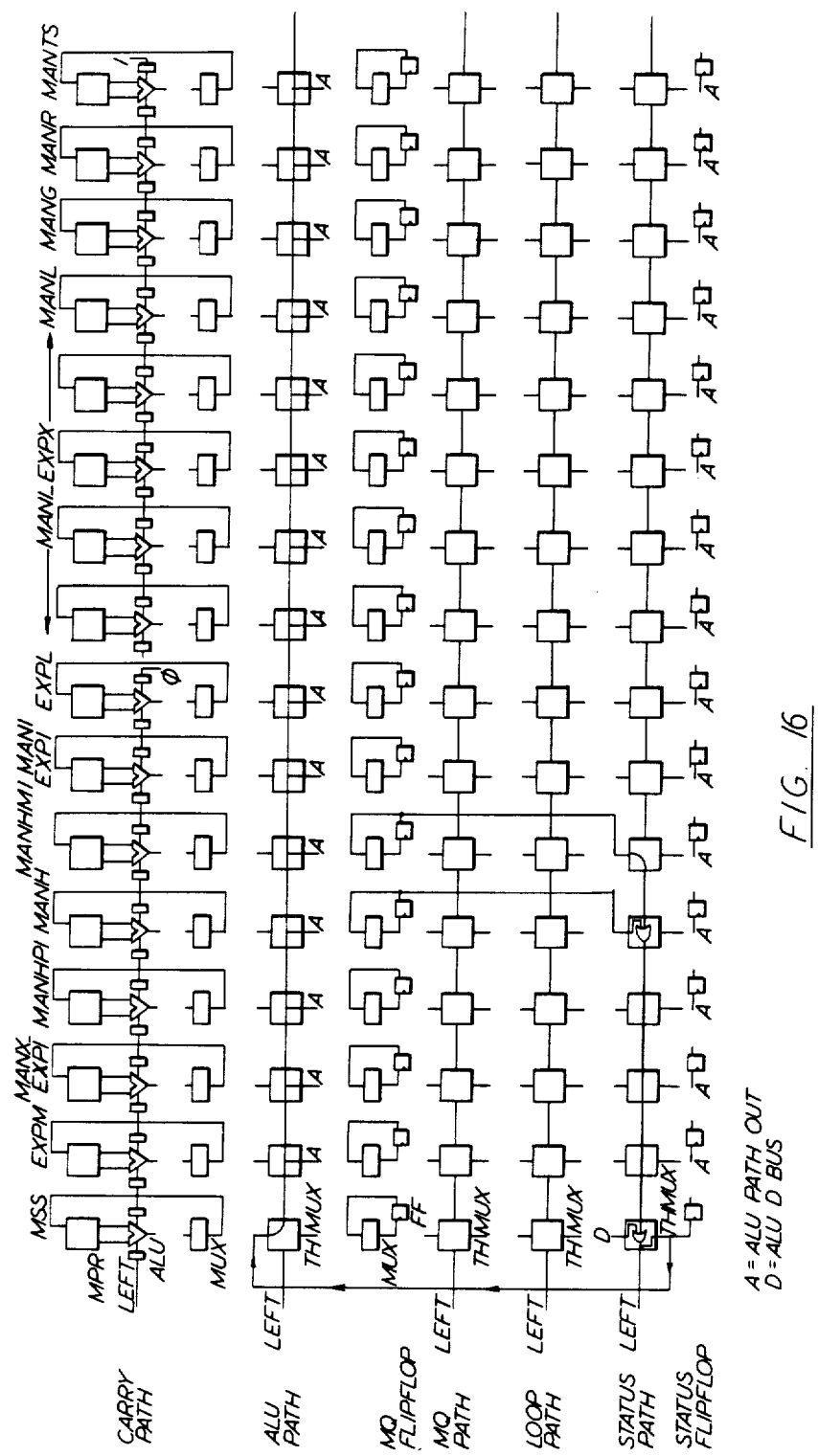
FIG. 16 is a path usage diagram depicting a floating double bit normalize first operation (FLTDBNF).

Register Usage:
  A—Constant=1 in exponent field (EXPL)
  B—Exponent
  MQ—Mantissa
ALU OP. B_Minus_A
Path Usage: Carry force carry in a EXPL to 0
  MQ, Loop—mantissa shift by 2
  Status—OR of MANH, MANHM1 and MSS
  ALU—distribution of status FIG. 16 shows the FloatingDBNF (Floating Double Bit Normalize First) path usage. The instruction initializes the status register for double bit normalization and is used as a test instruction where only the status is updated. The exponent is decremented by 2 by subtracting a constant with a 1 in EXPL while forcing a carry in of 0 at EXPL. The "OR" of the resulting exponent sign, MANH, MANHM1 (bit before hidden bit) is sent to all status flip-flop.

Register Usage:
  A—Constant=1 in exponent field (EXPL)
  B—Exponent
  MQ—Mantissa
ALU OP.—B_Minus_A
Path Usage:
  Carry-force carry in at EXPL to 0
  Status—OR of MANH, MANHM1 and MSS (exponent sign)
  ALU—Distribution of status The IEEE standard specifies that rounding is to be done to the result during automatic operations. There are many rounding modes but the mandatory mode is the following.

a. Add a ½ LSB if the resulting rounding bits (MANR, MANG, MANTS) is greater than ½ LSB (Round Greater RGT)

b. Round to the nearest even number if the rounding bits equal ½ LSB. (Round Equal RE).

So if we look at the last 4 bits of the mantissa, then:
½ LSB=0100
and round if the result is
a. >X100 (Round Greater)
b. =1100 (Round Equal)

The Floating RGT (Floating Round Greater Than Test) and the Floating RET (Floating Round Equal Test) is used to determine if rounding is needed. If the status is equal to zero after the test then rounding is needed. This instruction needs a rounding constant equal to ½ LSB as an operand. It should be noted that during rounding, the mantissa could overflow so it is necessary to do the overflow tests used in Phase 6.

Figure 17:
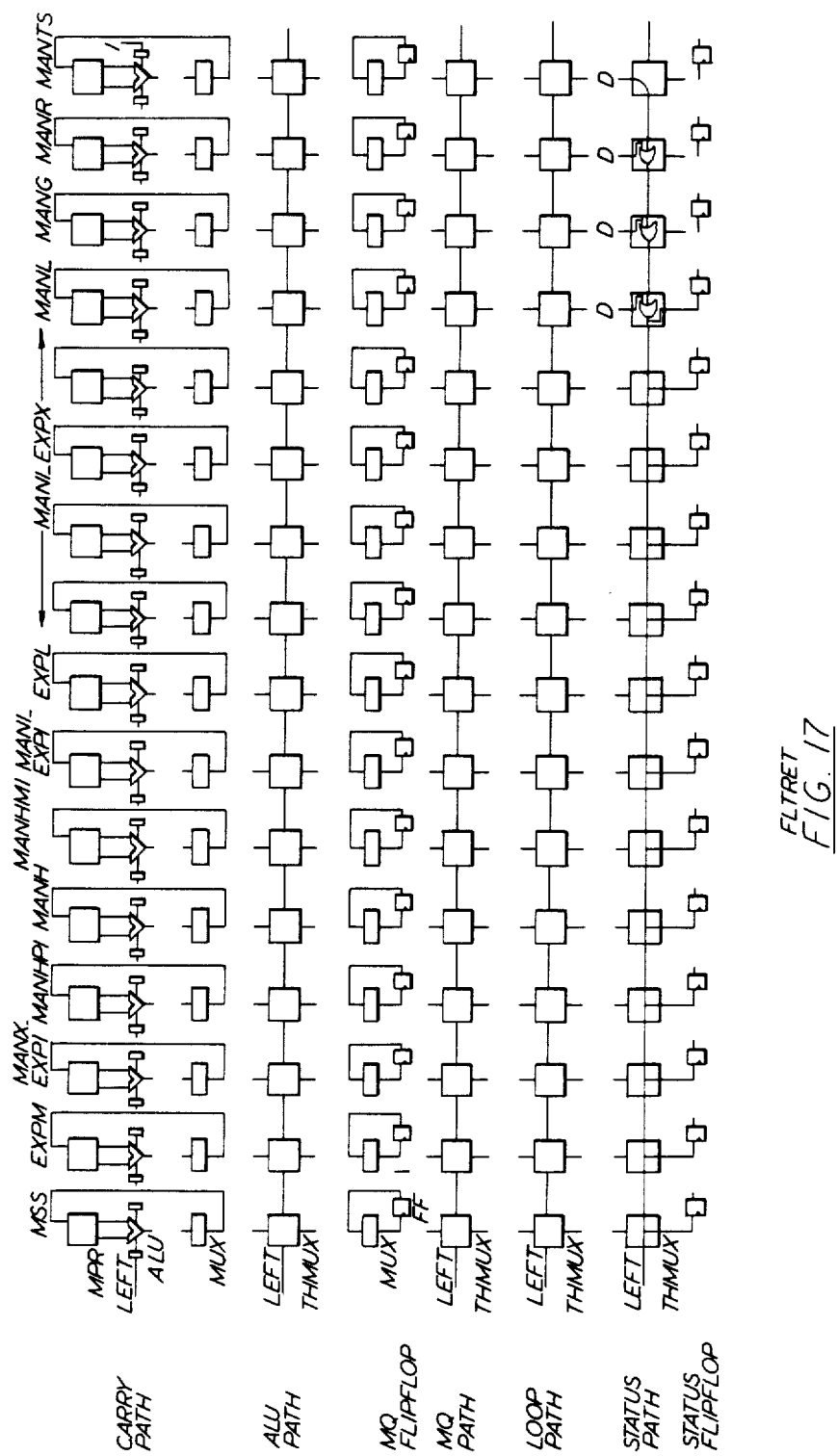
FIG. 17 is a path usage diagram showing floating round equal test operation (FLTRET).

FIG. 17 shows the FloatingRET (Floating Round Equal Test) path usage. The rounding bits of the mantissa is checked if it is equal to precisely ½ an LSB and that the LSB of the mantissa is equal to one (Mantissa is odd). The result of the test is distributed to the significant mantissa bits. If the results equal zero, the mantissa needs to be rounded. A rounding constant equal to half LSB is needed for this instruction. Only the states should be updated for this instruction.

Register Usage:
  A=Constant=0100 (rounding constant)
  B=Mantissa
ALU OP.
  XOR for MANG—MANTS
  XNOR for MANL
Path Usage:
  Status=Zero check for MANL—MANTS slices
  Status=distribution of resulting status to the higher order slices.

Figure 18:
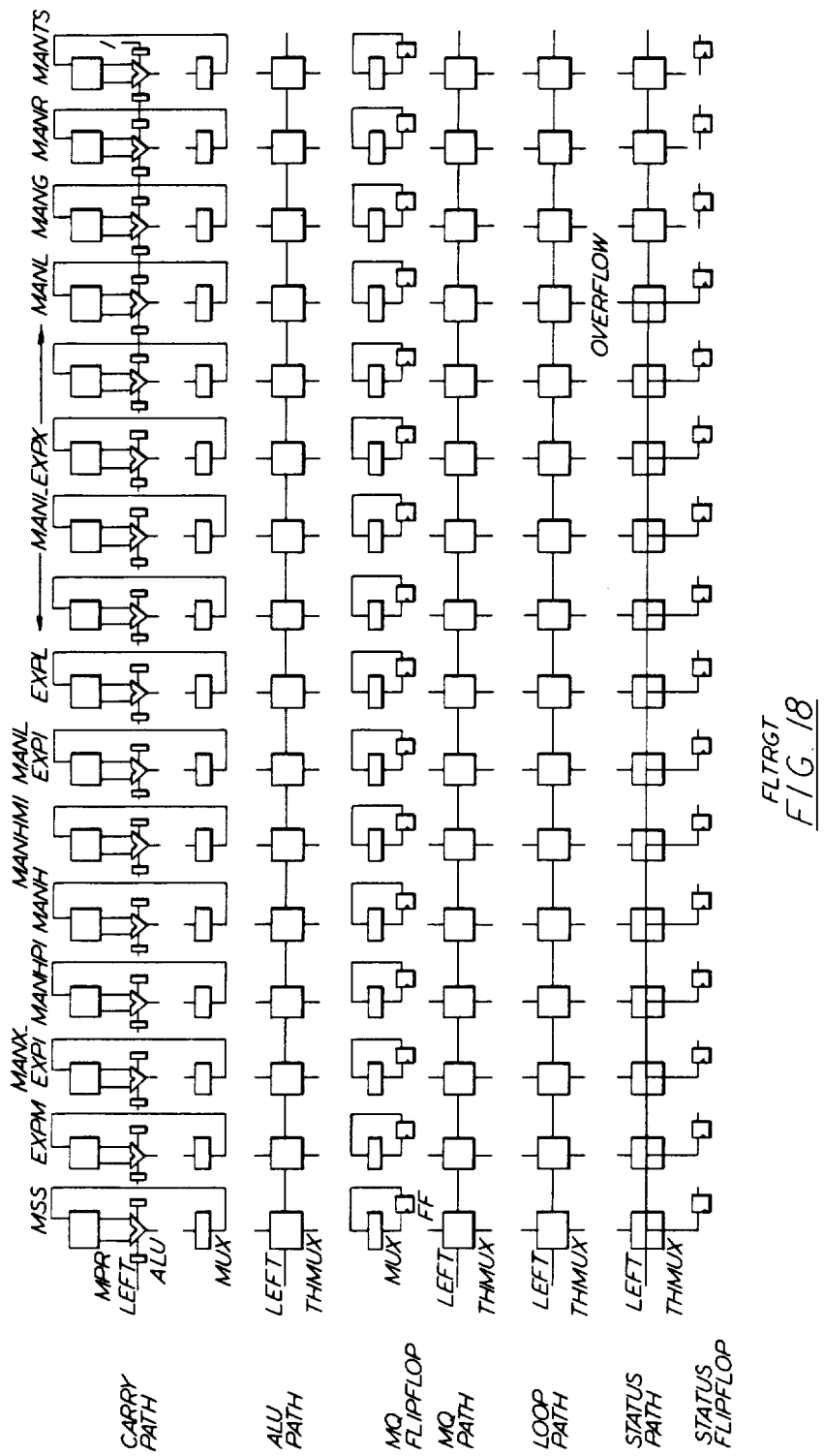
FIG. 18 is a path usage diagram showing floating round greater test (FLTRGT).

FIG. 18 shows the FloatingRGT (Floating Round Greater Test) path usage. The three rounding bits of the mantissa are checked to determine if it is greater than half LSB of the packed format. The result of the test is distributed to all the significant mantissa bits. The rounding constant is needed for this instruction and is subtracted to the rounding bits.

The Carry in or Overflow of the MANL bit is to signify if the rounding bit is greater than half an LSB. A result equal to zero signifies that the mantissa needs to be rounded. Only the status is enabled in this instruction.

Register Usage:
  A=Mantissa
  B=Constant=0100 (rounding constant)
ALU OP.
  B_Minus_A for MANG—Mants
  Zero for MANL
Path Usage:
  Status=Gets overflow of MANL and distributes to higher bits.

The resulting mantissa and exponent must be merged to a pack format for the final result. The mantissa is then shifted to the right by three to align it with the mantissa field of the packed format. During merging, the resulting mantissa is assumed to be normalized and the assumption is checked by looking at the MANH bit which should be a 1 to a normalized number. A zero at the MANH bit signifies a mantissa underflow result and the result is equated to zero or cleared. For normalized numbers, the final packed number gets the sign and mantissa field from the shifted mantissa and the exponent field from the exponent which is already aligned. The Floating FR (Floating Format Right) instruction is provided to align the mantissa and check for underflow. The Floating MG (Floating Merge) instruction is provided to extract the proper fields for the final result.

Figure 19:
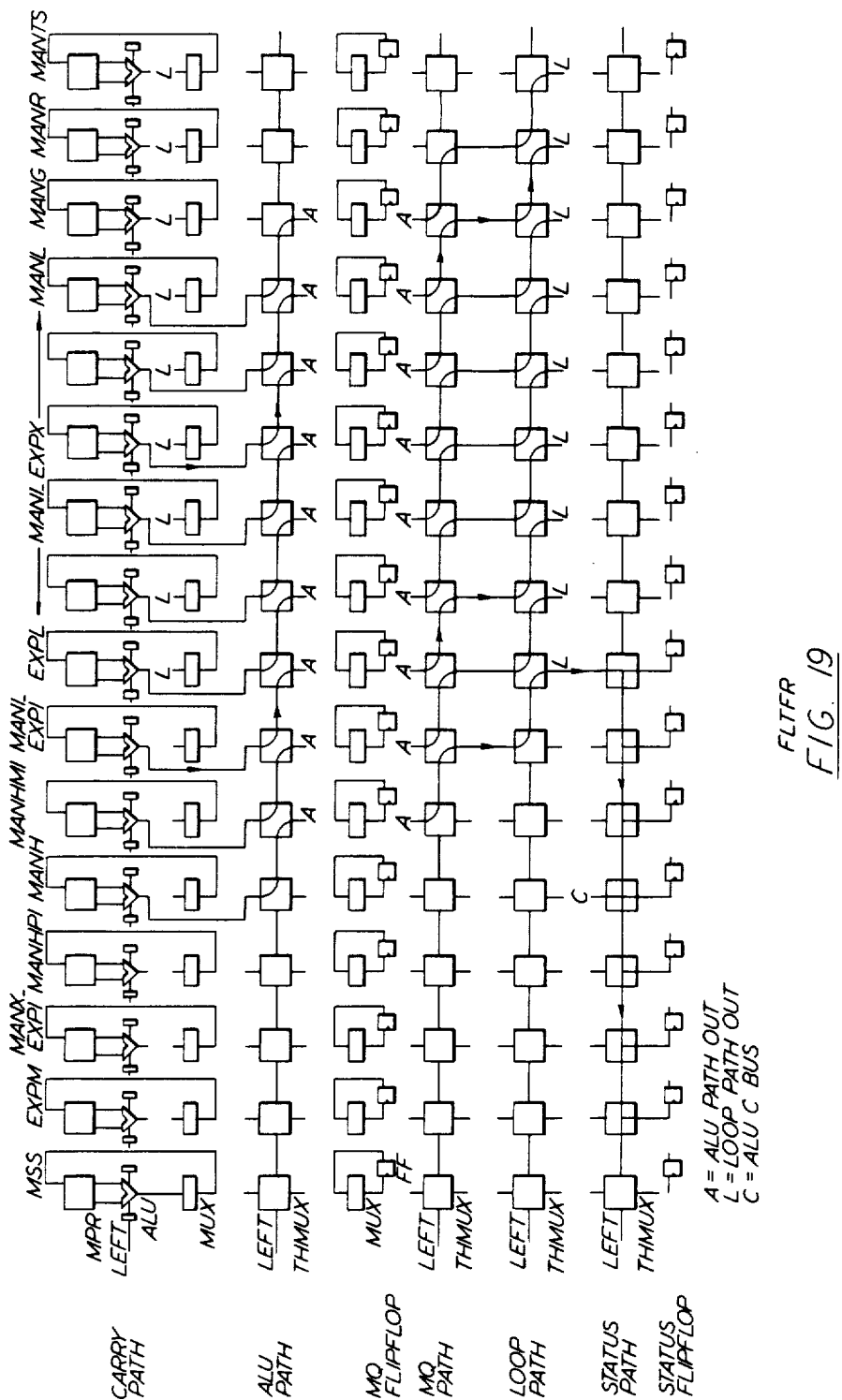
FIG. 19 is a path usage diagram showing floating format right operation (FLTFR).

FIG. 19 shows the Floating FR (Floating Format Right) path usage. The mantissa is prepared for packing into a word containing the sign, exponent and mantissa. The contents of A is transformed and moved to B. The transformation is:

1. The mantissa is shifted three bits to the right except for the sign bit which does not move.

2. The hidden bit is transmitted to the MSS bit in preparation for Status Broadcast and the FloatingMG instruction.

Figure 20:
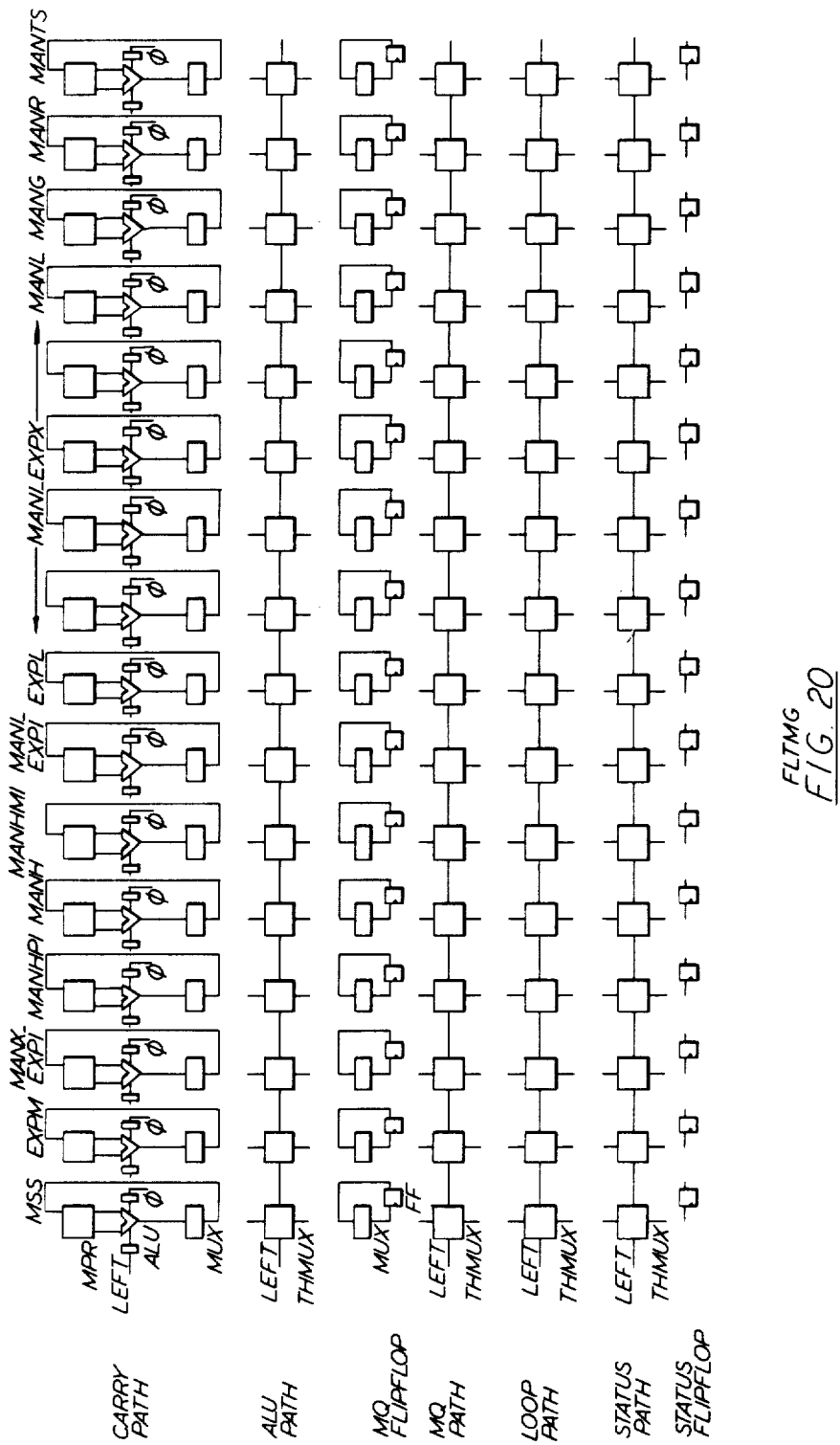
FIG. 20 is a path usage diagram showing a floating merge operation (FLTMG).

Register Usage:
  A—Mantissa
  B—Aligned Mantissa
ALU OP.
  Pass A
Path Usage:
  ALU, MQ, Loop—triple bit shift
  Status—transmission of MANH to MSS FIG. 20 shows the Floating MG (Floating Merge) path usage. The Sign, Exponent and Mantissa are combined into one word. The Exponent field is taken from A and the Sign and Mantissa are taken from B. The result is placed in B.

Register Usage:
A—Read—exponent
B=Read sign and mantissa, write packed format.
ALU OP.
Pass A—EXPM—EXPL
Pass B—MSS, MANI—MANTS The microprogram for a "normal" worst case. Floating point Add is shown below. The following nomenclature is used for the operation.

A FLT ADD B=Z
1. A, B,—original operands (packed format)
2. X, Y—sorted operands where the exponent of X is greater than or equal to the exponent of Y
3. C=result
4. N=No. of mantissa bits
5. K1=constant, 1 in exponent field (EXPL) used for denormalization and normalization
6. K2=Constant, 1 in MSS, used for conversion to 2's complement
7. K2=Constant, 1 in EXPG, used for rounding Subscript of e and m signifies exponent and mantissa, respectively.

1. Mov (A, MQ) (move A to MA)
2. FLTSE (A, B) {compares exponent field of A and B}
3. PSWAP (B, B) LOAD IF STATUS=1 {Register B will have number with bigger exponent and MQ will have number with smaller exponent, that is X→B, Y→MQ}
4. FLTME (X, Ye)—Extract exponent of X note Xe=Z
5. FLTF (X, Xm)—Extract mantissa of X
6. B Minus A (K2, Xm)—Store If Status=1 {Convert Xm to 2's complement}
7. FLTME (Y, Ye)—Extract exponent of Y
8. FLTFL (Y, Ym(MQ)—Extract mantissa of Y, destination to MQ)
9. B_Minus_A (Xe, Ye)—Determine shift count and store in Ye
10. FLTDBD (K1, Ye)—Store Status Only, Cin (EXPL)=0 {initialize status for double denormalize}
11. FloatingDBD (K1, Ye) Store if Status=1 {Condition double denormalize, repeated N/2 times for worst case condition}
12. FloatingSBD (K1, Ye)—Store Status Only, Cin EXPL=1 {Initialize status for single denormalizer}
13. FloatingSBD (K1, Ye)—Store if Status=1 {Conditional Single Denormalize}
14. B Minus A (K2, Ym)—Store if Sign=1 {Convert Ym to 2's complement}
15. A_Plus_B (Xm, Ym) {Add numbers}
16. XOR (K2, Zm) {convert result back to sign magnitude}
17. FloatingOT (Zm, Zm) {mantissa overflow test}
18. FloatingSBD (K1, Ze)—Store if Status=1 {Conditional denormalize}
19. FloatingDBNF (K1, Ze) Cin=1—Store Status only {Normalize test}
20. FloatingDBN (K1, Ze)—Store if Status=0. Cin=1 {Conditional normalize, repeated N/2 times for worst case condition}
21. FloatingSBNF (K1, Ze) Cin=0—Store if Status=0 {Normalize Test}
22. FloatingSBN (K1, Ze) Cin=0—Store if Status=0 {Conditional Normalized}
23. FloatingRET (K3, Zm) {Round Equal Test}—Store Status Only
24. A_PLUS_B (K3, Zm)—Store if Status=0
25. FloatingRGT (K3, Zm) {Round Greater Test}—Store Status Only
26. A_PLUS_B (K3, Zm)—Store if Status=0
27. FloatingOT (Zm, ZM) {Overflow Test}
28. FloatingSBD (K1, Ze)—Store if Status=1 {Conditional Denormalize}
29. FloatingFR (Zm, Zm) {Align Mantissa for Packing}
30. SBR {Broadcast Status of MSS to All Slices}
31. FloatingMQ (Ze, Zm)—{Merge Exponent and Mantissa to packed result} STORE RAM ONLY
32. Zero (Z, Z)—Store if Status=0 (Clear result—if mantissa is not normalized)

The major phases of the floating point multiply is shown below. The numbers to be multiplied are in IEEE format and the result will also be in IEEE format. As in the addition sequence, only the "normal" sequence is shown where the result does not overflow. also the sequence is not optimized of scalar operations.

1. UNPACK NUMBERS INTO MANTISSA AND EXPONENT PART

2. DETERMINE RESULTING EXPONENT

3. MULTIPLY MANTISSA

4. CONDITIONAL NORMALIZE

5. ROUND TEST

6. CONDITIONAL DENORMALIZE

7. MERGE MANTISSA AND EXPONENT INTO PACKED RESULT

The different phases are described below.
1. Unpacking numbers into mantissa and exponent: Same as unpacking operation of add: (see add phase 2)

FIG. 22 shows the FloatingMF (Floating Multiply First) path usage. The partial product accumulator "B" is cleared and the LSB of the significant mantissa (MANL) is distributed to all status flip-flops. The sign of the multiplier which should be in the MQ register is loaded into the sign of the product. This instruction prepares the status and the sign bit for the FloatingMI Instruction Register Usage.

B—accumulator
MQ—multiplier
ALU OP.
  Zero (sign bit through gets MQFF)
Path Usage:
  Status distribution of multiplier LSB (MANL)

Figure 21:
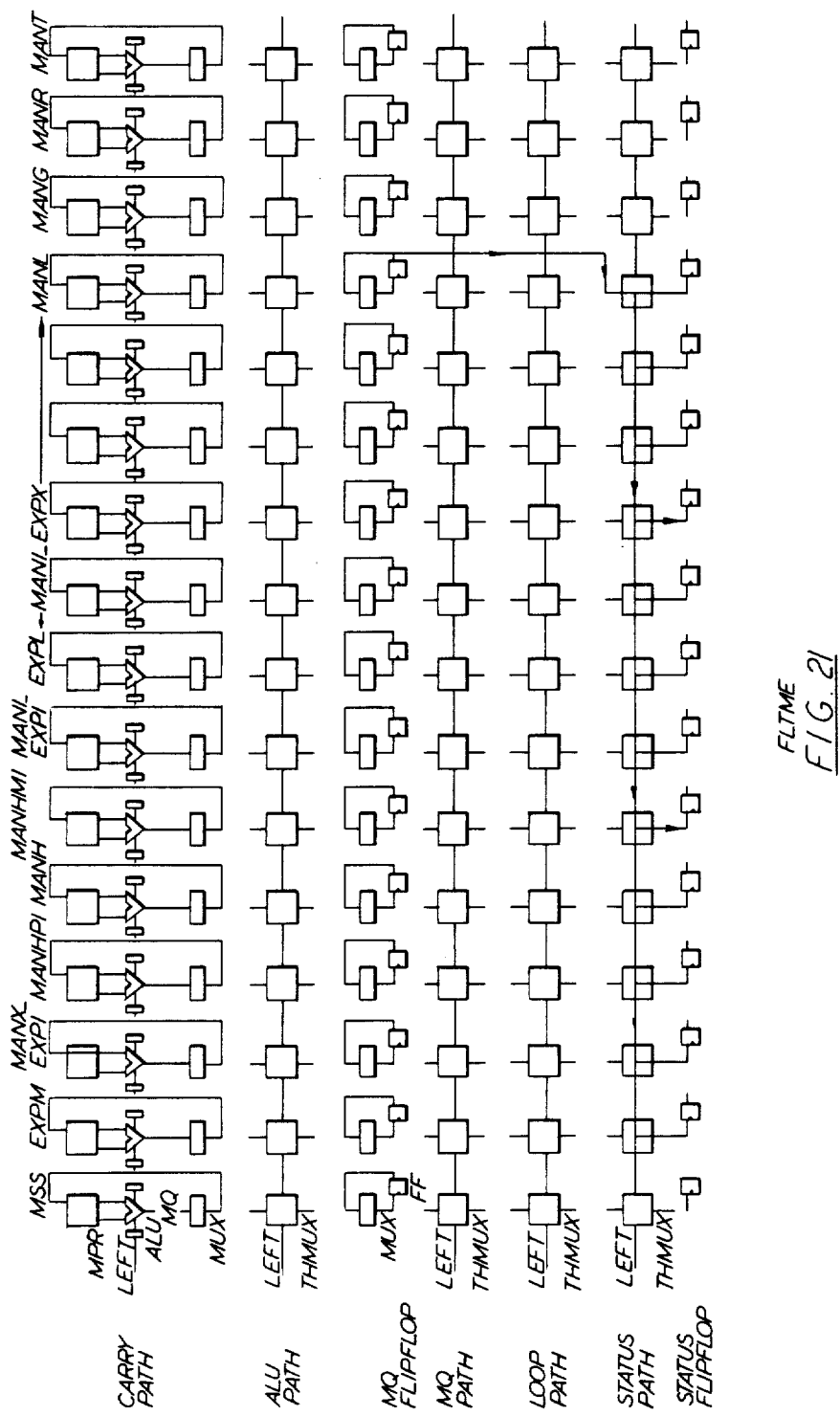
FIG. 21 is a path usage diagram showing a floating multiply first operation (FLTMF).

FIG. 21 shows the FloatingMI (Floating Multiply Intermediate) path usage. the partial product in "B" is added to the multiplicant in "A" if the status is true or the partial product is passed through if the status if false.

The ALU operation above is only done for the significant mantissa bits (MANPH2 to MANL). The sign bit's ALU does an XDR of "A" and "B" to determine the product's sign. All other bits (MANX_EXPI, EXPM) remain unchanged. The ALU output is right shifted by one bit placing a zero into the MANHP1 bit while the higher order bits are not shifted. The result that gets shifted into the MANT (Sticky bit) is the OR of the ALU output of the MANT and MANR slices. The multiplier in the MQ is also shifted right and the new LSB (MANL) of the multiplier is sent to all status flip-flops to prepare for the next cycle. The very first FloatingMI cycle is initialized by the FloatingMF instruction.

Register Usage:
  A - multiplicant
  B - partial product
  MQ - multiplier
ALU OP.
  MANR - MANT = B Plus Cin
  MANHP1 - MANL = A Plus B if status = 1
                  B Plus Cin if status = 0
  EXPM - EXP1_MANX = B Plus Cin
  MSS            = A VOR B
Path Usages
  Carry - Force 0 carry in for non-significant mantissa bits
  ALU - Right shift for partial product
  MQ - Right shift for multiplier
  Status - Distribution of new (MANL) LSB of multiplier and production of sticky bit (MANT or MANR)

2. The resulting exponent for a floating point multiply is just the sum of the exponent. But in IEEE format, the exponent is really biased that is:

Real exponent=stored exponent —Bias.

This means that a Bias should be subtracted to the sum of the exponents. An added complexity is that during the mantissa multiply phase, the mantissa is actually denormalized. This denormalization process should minus the exponent by 1. Therefore, the constant to be subtracted to the sum of the exponents equal Bias $-1$ which is stored in the scratchpad register at initialization.

3. The phase achieves two things. One is to determine the resulting sign which is just the XOR of the sign bits. The second is to do the actual multiplication of the significant mantissa port. The instructions are supplied for this purpose which is the FLTMF (FLT Multiply First) and the FLTMI (FLT Multiply Intermediates). The method for doing multiplication of the mantissa is by using the "add and shift" algorithm used frequently for integer multiplication. The difference is that during an add the sign bit of the partial product does not change. Also during the shifting process, the denormalization rules stated in the standard (that is the sticky bit acts as intimate precision) should be implemented. The add and shift process is actually repeated by a constant equal to the number of mantissa significant bits. The detailed description of the instructions are shown below.

4. Condition Normalize. When multiplying two normalized numbers using the "add and shift" process, the partial product may have to be normalized by, at most, one bit. The FLTSBNF and FLTSBN described previously is used in this phase.

5, 6, 7. The Rounding, Conditional Denormalize and Packing result back into IEEE format is the same as in the "add sequence".

The microprogram for the Floating point multiply using the described sequence is shown below. The same nomenclature for the floating point add is used. An added constant is K4=Bias—.

| | | |
|---|---|---|
| 1. | FLTME (B, Be) | Extract exponent of B |
| 2. | FLTFL (B, Bm) | Extract mantissa of B, result should be in MQ |
| 3. | FLTME (A, Ae) | Extract exponent of A |
| 4. | FLTFL (A, AM) | Extract mantissa of A |
| 5. | A plus B (Ae, Bu) | Add exponent of the result if Ze |
| 6. | B_Minus A (K4, Ze) | Correct resulting exponent |
| 7. | FLTMF (Am, Zm) | FLT Multiply First |
| 8. | FLTMI (AM, ZN) | FLT Multiply Interrmediate, repeated N times |
| 9. | MOV (Zm, MQ) | Move resulting mantissa for preparation for conditional normalize |
| 10. | FloatingSBNF (K1, Ze) | |
| 11. | FloatingSBN (K1, ZE) | Store if Status = 0 (conditional normalize) |
| 12. | FloatingRET (K3, Zm) | |
| 13. | A_Plus_B (K3, ZM) | Store if Status = 0 |
| 14. | FloatingRGT (K3, Zm) | |
| 15. | A_Plus_B (K3, Zm) | Store if Status = 0 |
| 16. | FloatingDT (Zm, Zm) | |
| 17. | FloatingSBD (K1, Ze) | Store if Status = 1 |
| 18. | FloatingFR (Zm, Zm) | |
| 19. | FloatingMG (Ze, Zm) | |

What is claimed is:

1. A processor apparatus for performing floating point arithmetic, by operating on at least first and second digital words each of a predetermined given number of bits with each word having a given number of slices each of a lesser number of bits than said word, with a first slice designated as a least significant slice (LSS) a second slice designated as an intermediate significant slice (ISS) and a third slice designated as a most significant slice (MSS), said processor apparatus including a plurality of individual processing cells of a number equal to said number of bits in said word and interconnected from left to right in a chain so that any of said processing cells can operate to receive any bit of any slice, wherein each of said cells comprises;

memory means having first and second output ports each for transmitting an output bit of a digital word and having an input port for receiving a bit of a digital word and having means for storing said words, said first and second output ports and said input port being addressable;

first multiplexer means, having an output coupled to said input port of said memory means and having a plurality of inputs, for selectively coupling any one of said inputs to said output when said one of said inputs is selected by a control signal applied to a control terminal of said first multiplexer means, arithmetic logic unit means, having a first input port coupled to said first output port of said memory means and a second input port coupled to said second output port of said memory means, for performing any one of a given number of arithmetic operations, said arithmetic logic unit means having an output port for providing a digital output indicative of the result of a performed operation, said output port of said arithmetic logic unit means coupled to a digital bus means having an output coupled to a first input of said first multiplexer means, controllable multiplier/quotient storage means having one input coupled to said digital bus means and an output coupled to a second input of said first multiplexer means, said multiplier/quotient storage means operative to store digital data indicative of an arithmetic operation, and having a control terminal for receiving a control signal for controlling the flow of data from said multiplier/quotient storage means, controllable loop path means having one input coupled to said digital bus means and one output coupled to a third input of said first multiplexer means and to an input of said controllable multiplier/quotient storage means, and having a control terminal for receiving a control signal for controlling the flow of data from said loop path means, controllable status path means having one input coupled to said digital bus means and an output coupled to a fourth input of said first multiplexer means and to an input of said controllable multiplier/quotient means and having a control terminal for receiving a control signal for controlling the flow of data from said status path means, control means coupled to said first multiplexer means, said arithmetic logic unit means, said multiplier/quotient storage means, said loop path means and said status path means for providing control signals thereto to enable any of said means to provide data at the output of said means in accordance with the control signal and in accordance with a given operation to be performed, whereby any bit stored in any of said means can serve as said first, second or third slice of said digital word.

2. The processor apparatus according to claim 1, wherein said memory means is a random access memory (RAM) with a Read/Address input for addressing said first output port and a Read/Write address input for addressing said second output port, with said input port also addressed by said Read/Write address.

3. The processor apparatus according to claim 2, wherein said memory means further includes a first plurality of general purpose registers and a second plurality of scratchpad registers.

4. The processor apparatus according to claim 1, wherein said arithmetic logic unit means further includes a carry input port for receiving carry data indicative of an arithmetic operation from another processor cell on the right and an output port for transmitting carry data indicative of an arithmetic operation performed by said cell.

5. The processor apparatus according to claim 1, further including a transversal horizontal multiplexer having a control input coupled to said control means and having an input coupled to said digital bus means and operative to transmit data to the right or left to an adjacent processing cell as controlled by said control means.

6. The processor apparatus according to claim 1, wherein said logic unit means can perform 16 arithmetic operations.

7. The processor apparatus according to claim 1, wherein said multiplier/quotient storage means includes a flip-flop having an output coupled to said second input of said first multiplexer means and having an input coupled to the output of a multiplexer, with said multiplexer having a plurality of inputs with a first input coupled to the output of said flip-flop, with a second input coupled to the input port of said memory means, with a third input coupled to the output of said loop path means, with a fourth input coupled to the output of said status path means, with a fifth input coupled to the output of said digital bus means, said multiplexer having a control terminal coupled to said control means for selecting any one of said inputs for application to said output and therefore to said flip-flop.

8. The processor apparatus according to claim 7, further including a transversal horizontal multiplexer having a control input coupled to said control means and further having an input coupled to the output of said flip-flop and operative to transmit the output status of said flip-flop either to the right or left to an adjacent processing cell as controlled by said control means.

9. The processor apparatus according to claim 7, wherein said loop path means further includes a transversal horizontal multiplexer having an input coupled to the output of a loop path multiplexer with said loop path multiplexer having one input coupled to said digital bus means, with a second input coupled to said second input of said first multiplexer, with a third input coupled to the output of said horizontal transversal multiplexer associated with said multiplier/quotient storage means, with the output of said loop path transversal multiplexer coupled to said third input of said first multiplexer means.

10. The processor apparatus according to claim 1, wherein said status path means includes a transversal horizontal multiplexer having an input coupled to the output of a status path multiplexer, with a first input of said status path multiplexer coupled to said input port of said memory means, with a second input coupled to said digital bus means, with a third input coupled to the output of said multiplier/quotient storage means, with a fourth input coupled to the output of said loop path means, with the output of said transversal multiplexer associated with said status path means coupled to said fourth input of said first multiplexer, and having a control terminal coupled to said control means for selecting any one of said input signals to said status path multiplexer to be applied to said output.

* * * * *